United States Patent
Aliaga et al.

(10) Patent No.: US 7,362,969 B2
(45) Date of Patent: Apr. 22, 2008

(54) CAMERA MODEL AND CALIBRATION PROCEDURE FOR OMNIDIRECTIONAL PARABOLOIDAL CATADIOPTRIC CAMERAS

(75) Inventors: Daniel G. Aliaga, Millington, NJ (US); Ingrid B. Carlborn, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1337 days.

(21) Appl. No.: 10/156,189

(22) Filed: May 29, 2002

(65) Prior Publication Data

US 2003/0004694 A1     Jan. 2, 2003

Related U.S. Application Data

(60) Provisional application No. 60/294,061, filed on May 29, 2001.

(51) Int. Cl.
    *G03B 37/00*      (2006.01)
    *G03B 43/00*      (2006.01)
    *H04N 17/00*      (2006.01)

(52) U.S. Cl. .................. 396/429; 348/36; 348/187

(58) Field of Classification Search ................ 396/429; 348/175, 176, 187, 188
See application file for complete search history.

(56) References Cited

U.S. PATENT DOCUMENTS

| | | | |
|---|---|---|---|
| 5,920,376 | A | 7/1999 | Bruckstein et al. |
| 6,023,523 | A | 2/2000 | Cohen et al. |
| 6,097,394 | A | 8/2000 | Levoy et al. |
| 6,118,474 | A | 9/2000 | Nayar |
| 6,870,563 | B1 * | 3/2005 | Kang ........................ 348/222.1 |

OTHER PUBLICATIONS

F. Bruckstein and T. Richardson, "Omniview Cameras with Curved Surface Mirrors," IEEE Workshop on Omnidirectional Vision, pp. 79-84, 2000.
S. Baker and S. Nayar, "A Theory of Catadioptric Image Formation," IEEE International Conference on Computer Vision, pp. 35-42, 1998.
S. Nayar, "Catadioptric Omnidirectional Camera", IEEE Conference on Computer Vision and Pattern Recognition, 1997, pp. 482-488.
"RemoteReality: 360 ° Immersive Imaging Solutions," HTML links to <http://www.remotereality.com> downloaded on Apr. 18, 2002.
R. Tsai, "A Versatile Camera Calibration Technique for High-Accuracy 3 D Machine Vision Metrology Using Off-the-Shelf TV Cameras and Lenses," IEEE Journal of Robotics and Automation, RA-3:4, 1987, pp. 323-344.
"Chapter 15: Modeling of Data," pp. 656-706, of *Numerical Recipes in C* by W. Press, et al., Second Edition, Cambridge University Press, 1999.

(Continued)

Primary Examiner—W. B. Perkey

(57) ABSTRACT

A paraboloidal catadioptric camera is calibrated by relaxing the assumption of an ideal system to account for perspective projection, radial distortion, and mirror misalignment occurring within the camera system. Calibration points, which are small and visually distinct objects, are distributed at fixed locations within an environment. Omnidirectional images are captured by the catadioptric camera at different locations of the environment. Data points are obtained by identifying the location of the calibration points in each captured image. An optimization algorithm best-fits the data points to a perspective camera model in order to derive parameters, which are used to calibrate the catadioptric camera.

19 Claims, 5 Drawing Sheets

OTHER PUBLICATIONS

E. H. Adelson and J. Bergen, "The Plenoptic Function and the Elements of Early Vision," *Compuatational Models of Visual Processing*, MIT Press, Cambridge, MA, 3-20, 1991.

Chen S. E, "QuickTime VR—An Image-Based Approach to Virtual Environment Navigation", *Computer Graphics (SIGGRAPH '95)*, pp. 29-38, 1995.

R. Szeliski and H. Shum, "Creating full view panoramic image mosaics and texture-mapped models", *Computer Graphics (SIGGRAPH '97)*, pp. 251-258, 1997.

H. Shum and L. He, "Rendering with Concentric Mosaics" *Computer Graphics (SIGGRAPH '99)*, pp. 299-306, 1999.

S. Gortler et al., "The Lumigraph," *Computer Graphics (SIGGRAPH '96)*, pp. 43-54, 1996.

M. Levoy and P. Hanrahan, "Light Field Rendering," *Computer Graphics (SIGGRAPH '96)*, pp. 171-180, 1996.

L. McMillan and G. Bishop, "Plenoptic Modeling: An Image-Based Rendering System," *Computer Graphics (SIGGRAPH '95)*, pp. 39-46, 1995.

D. Aliaga, "Accurate Catadioptric Calibration for Real-time Pose Estimation in Room-size Environment,", *IEEE International Conference on Computer Vision (ICCV '01)*, Jul. 2001, pp. 127-134.

S. Gottschalk et al., "OBBTree: A Hierarchical Structure for Rapid Interference Detection," *Computer Graphics (SIGGRAPH '96)*.

C. Tomasi and T. Kanade, "Shape and Motion from Image Streams: A Factorization Method," Cornell Technical Report 92-1270, Mar. 1992.

"KLT: An Implementation of the Kanade-Lucas-Tomasi Feature Tracker," <http://vision.stanford.edu/~birch/klt>, downloaded on Nov. 12, 2002.

D. Aliaga and I. Carlborn, "Plenoptic Stitching: A Scalable Method for Reconstructing Interactive Walkthroughs," *Computer Graphics (ACM SIGGRAPH '01 Proceedings)*, Aug. 2001, pp. 443-450.

\* cited by examiner

CAMERA MODEL AND CALIBRATION PROCEDURE FOR OMNIDIRECTIONAL PARABOLOIDAL CATADIOPTRIC CAMERAS

CROSS-REFERENCE TO RELATED APPLICATIONS

This application claims the benefit of U.S. Provisional Application No. 60/294,061 filed May 29, 2001, the contents of which are hereby incorporated by reference in its entirety. This application is related to U.S. patent application Ser. No. 10/122,337 filed on Apr. 16, 2002 by the same named inventors of the present application, the contents of which are hereby incorporated by reference in its entirety.

BACKGROUND OF THE INVENTION

The present invention relates to the generation of omnidirectional images, and more particularly, to a calibration model for an omnidirectional camera.

DESCRIPTION OF THE RELATED ART

Omnidirectional still and video cameras have become increasingly popular in applications such as telepresence, three-dimensional (3D) reconstruction, and autonomous navigation. Omnidirectional images can be created by several techniques, not all of which create images from a single center-of-projection (COP). One family of omnidirectional cameras uses a catadioptric system with a paraboloidal mirror, as proposed in the paper "Catadioptric Omnidirectional Camera", by S. Nayar, IEEE Conference on Computer Vision and Pattern Recognition, 1997, pp. 482-488, and in U.S. Pat. No. 6,118,474, issued Sep. 12, 2000, both of which are hereby incorporated by reference in their entireties.

Nayar's camera design uses a convex paraboloidal mirror (i.e., a mirror whose profile is a parabola and whose reflective-side is convex, yielding a focal point of the parabola on the non-reflective side). The mirror is placed in the field-of-view of a camera equipped with a lens system that images a nearly orthographic projection of the mirror surface. The camera's image plane is perpendicular to the mirror's central axis. Therefore, a full hemisphere of the field-of-view (FOV) (360 degrees by 180 degrees) in front of the mirror's reflective surface is reflected onto the camera's image plane, with the exception of an area occluded by the mount near the center of the image. Each captured omnidirectional image has a substantially single COP, which yields simple transformations for obtaining several types of projections (e.g., planar, cylindrical). The camera installed in front of the mirror may comprise a still or video camera, or any other appropriate digitizing camera, as will be contemplated by those ordinarily skilled in the art.

In practice, it is difficult to achieve a perfect orthographic projection with current lens and camera technologies. This may result, for example, in a slight undesired perspective projection in addition to mirror misalignment and radial distortion of the lens. A camera implementation using a telecentric lens or a camera implementation using a zoom lens combined with magnification lenses may produce close to ideal orthographic projections but both severely limit the placement and size of the mirror. Thus, both implementations are prone to a slight undesired perspective projection. The presence of undesired perspective projection, mirror misalignment, and radial distortion make accurate calibration of a catadioptric paraboloidal camera a difficult task for applications such as determining the position and orientation of the camera in the surrounding environment.

Alternative mirror configurations have also been employed to ease the requirement for lens systems with ideal orthographic projection. For instance, a two parabolic mirror design has been disclosed by F. Bruckstein, T. Richardson in U.S. Pat. No. 5,920,376, which issued on Jul. 6, 1999, and in the paper "Omniview Cameras with Curved Surface Mirrors," IEEE Workshop on Omnidirectional Vision, pp. 79-84, 2000. In this design, incoming rays bounce off a convex paraboloidal mirror and are reflected off a second concave paraboloidal mirror centered opposite the first mirror. The reflected rays converge at the second mirror's focal point, where a camera with a standard perspective lens is placed. This configuration relies on accurately computing the effective COP for the camera, and then precisely placing the camera so that the COP is located at the focal point of the second mirror. A deviation in the placement of the camera's COP will cause the camera to capture rays that correspond to slightly non-parallel rays reflected off the first mirror.

Other configurations have also been developed, as described in the paper "A Theory of Catadioptric Image Formation", by S. Baker and S. Nayar, IEEE International Conference on Computer Vision, pp. 35-42, 1998. For instance, hyperboloid mirrors are designed to converge rays in front of the mirror. However, the performance of the hyperboloid mirror design similarly suffers when the camera is not precisely located at the converging point.

It would therefore be advantageous to be able to relax the assumption of an ideal projection system (i.e., perfect orthographic projection and perfect placement) for the camera and as well as incorporate into the camera model mirror misalignment and radial distortion of the lens system.

SUMMARY OF THE INVENTION

The present invention provides a system and method for calibrating an omnidirectional paraboloidal catadioptric camera based on a model, which does not assume an ideal projection system for the camera. Instead, the present invention enhances the calibration model of the omnidirectional camera by taking into account and compensating for undesired perspective projection, mirror misalignment, and radial distortion.

Given the calibration model of the invention, pose estimation of the described omnidirectional camera may be performed with high accuracy. Pose estimation computes the position and orientation of the camera relative to the surrounding environment for either a stationary or moving camera. The calibration model may be used to measure the distance to known environment features by using their projection onto an omnidirectional image. Triangulation, or other methods known to those ordinarily skilled in the art, may be used to obtain the camera position and orientation.

Other advantages of the present invention will become more apparent from the detailed description given hereafter. However, it should be understood that the detailed description and specific examples, while indicating preferred embodiments of the invention, are given by way of illustration only, since various changes and at modifications within the spirit and scope of the invention will become apparent to those skilled in the art from this detailed description.

BRIEF DESCRIPTION OF THE DRAWINGS

The present invention will become more fully understood from the detailed description given below and the accompanying drawings, which are given for purposes of illustration only, and thus do not limit the present invention.

DETAILED DESCRIPTION OF THE INVENTION

Ideal Paraboloidal Catadioptric Camera Model

Figure 1:
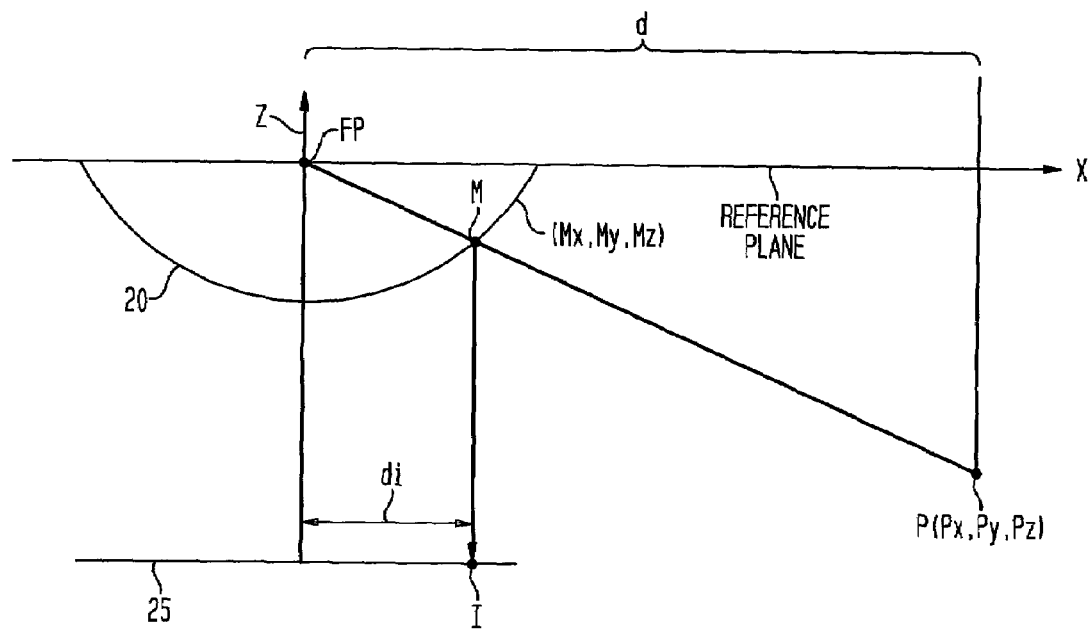
FIG. 1 illustrates a camera model for an ideal paraboloidal catadioptric system.

An ideal model for a paraboloidal catadioptric camera is illustrated in FIG. 1. In a 3D environment, described by a coordinate system (x, y, z), a ray of light radiating from a given point P ($p_x$, $p_y$, $p_z$) reflects off of point M ($m_x$, $m_y$, $m_z$) on the paraboloidal mirror 20, and projects onto the image plane 25 at point I. Since the paraboloidal mirror 20 is symmetric about the z-axis, point M may be represented as ($m_r$, θ, $m_z$) and P as ($p_r$, θ, $p_z$), where $m_r = \sqrt{m_x^2 + m_y^2}$, $p_r = \sqrt{p_x^2 + p_y^2}$, and θ is the angle between the projection of the light ray onto the xy-plane and the x-axis. The reference plane of FIG. 1, which lies in the xy-plane, is perpendicular to the central axis of the paraboloidal mirror and goes through the focal point of the parabola. The camera image plane 25 is parallel to the aforementioned xy-plane. Since the profile of the mirror corresponds to the parabola $$m_z = \frac{m_r^2}{2r} - \frac{r}{2}$$

(where r is the measured radius of the mirror in the reference plane), the coordinates $m_r$ and $m_z$ are easily computed from the projected position I ($i_x$, $i_y$).

For applications that depend on pose estimation, the distance d between point P, as projected on the reference plane, and the focal point FP of the parabola of at least two fixed points P may be used to triangulate the camera's position. This projected distance d may be calculated as $$d = \frac{(p_z m_r)}{m_z}.$$

However, due to the unknown perspective projection, mirror misalignment, and radial distortion inherent in most (if not all) paraboloidal catadioptric camera systems, the above method for distance calculation does not yield very accurate results. In fact, in a 5×5 meter room using distances, such as d, for triangulating the position of the camera may yield position errors close to 45 centimeters.

Paraboloidal Catadioptric Camera Model of the Present Invention

Figure 2:
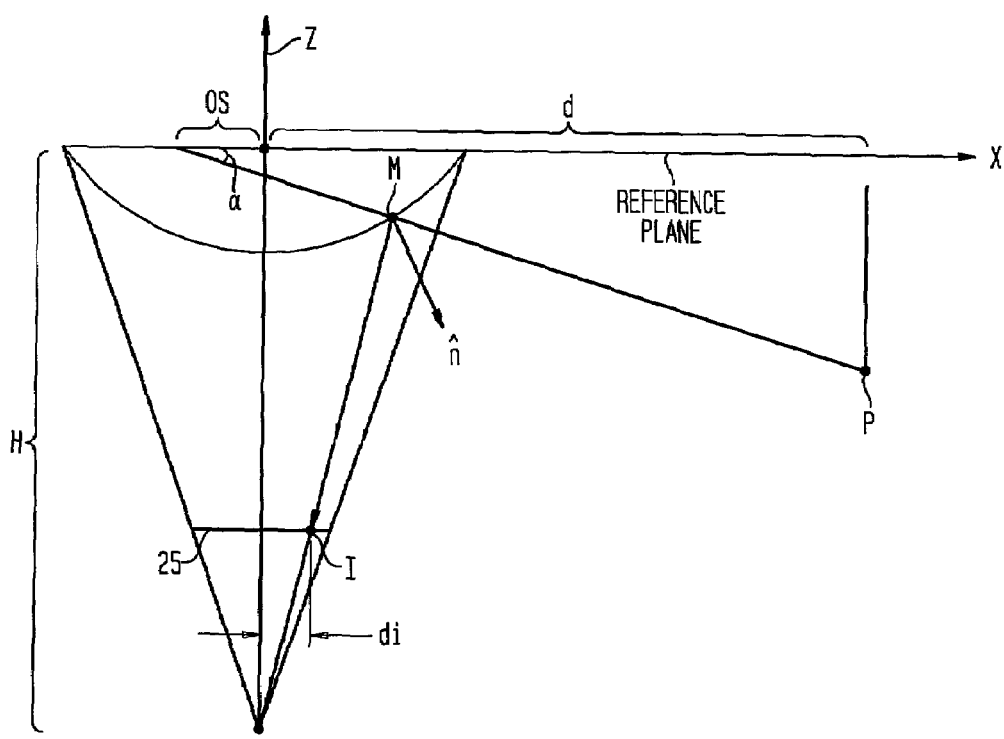
FIG. 2 illustrates a camera model for the paraboloidal catadioptric system of the present invention.

FIG. 2 illustrates a camera model for a paraboloidal catadioptric system according to the present invention, which accounts for undesired perspective projection, mirror misalignment, and radial distortion. Points P, M, and I are equivalent to those illustrated in FIG. 1. However, the model of FIG. 2 differs from the ideal model in that all of the light rays reflected by mirror 20 and captured by the camera lens are assumed to converge at a distance H from the mirror's focal point FP.

In the camera model of the present invention, the distance of convergence H is calculated. Also, the closest distance between the mirror 20 and the image plane 25 is computed, as well as radial distortion and mirror misalignment (e.g., unknown mirror translation and unknown mirror rotation with respect to the mirror reference plane).

In addition, because of the undesired perspective projection, mirror 20 reflects objects that are slightly behind the reference plane. Accordingly, the present invention determines the subset of the mirror image (i.e., a mirror radius) that exactly reflects a hemispherical FOV in the image plane.

According to basic principles of optics, the incident angle of a light ray is equivalent to the reflected angle. Using the notation of FIG. 1, this may be expressed as:

$$\frac{i-m}{\|i-m\|} \cdot \frac{\hat{n}}{\|\hat{n}\|} = \frac{p-m}{\|p-m\|} \cdot \frac{\hat{n}}{\|\hat{n}\|} \qquad \text{Eq. 1}$$

where $\hat{n}$ is the surface normal at point M.

For a given 3D point P, a measured mirror radius r, and a current estimated convergence distance H, we may rearrange the terms of equation (1):

$$m_r^5 - p_r m_r^4 + 2r^2 m_r^3 + (2p_r rH - 2r^2 p_r) m_r^2 + (r^4 - 4r^2 p_z H)$$
$$m_r - (r^4 p_r + 2r^3 H p_r) = 0 \qquad \text{Eq. 2}$$

After solving this $5^{th}$ degree polynomial for $m_r$, and choosing the real solution in the range [0, r], $m_z$ may be obtained from the parabola $$m_z = \frac{m_r^2}{2r} - \frac{r}{2}.$$

With this new information, the distance d between point P and the focal point FP of the parabola, as projected on the reference plane, may be more accurately determined and used for pose estimation. When extending the incident light ray (i.e., the ray from point P to the mirror) to intersect the reference plane of the mirror, the light ray overshoots the parabola's focal point FP by an overshoot distance $$os = \frac{m_z}{\tan(\alpha)} - m_r,$$

where α is the angle of the incident ray with respect to the x-y plane. Using the camera model of the present invention, the distance d may be more accurately computed with equation (3):

$$d = \frac{p_z m_r}{m_z} - \frac{m_z}{\tan(\alpha)} + m_r \qquad \text{Eq. 3}$$

The radius $r_{180}$ of the mirror 20 that exactly reflects 180 degrees may be obtained by substituting the relation $$p_z = m_z = \frac{m_r^2}{2r} - \frac{r}{2}$$

into equation (2). The polynomial expression for equation (2) may be simplified to equation (4):

$$r_{180} = \sqrt{r(\sqrt{(H^2 + 4Hr)} - H - r)} \qquad \text{Eq. 4}$$

Exemplary Configuration of the Camera System

Figure 5:
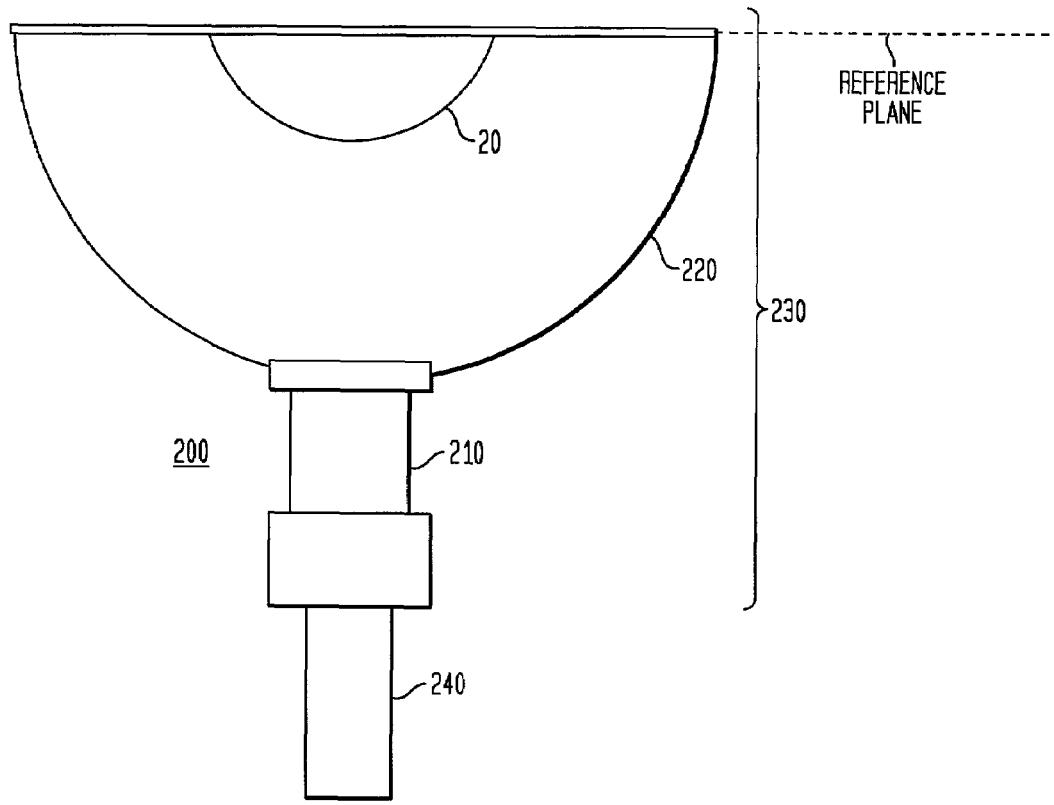
FIG. 5 illustrates an exemplary configuration of the catadioptric camera system of the present invention.

FIG. 5 illustrates an exemplary configuration of the catadioptric camera system 200 of the present invention. In an exemplary embodiment, the camera system 200 includes a paraboloidal catadioptric omnidirectional camera 230, similar to the commercially available S1 camera of Cyclo Vision/Remote Reality Incorporated, which is based on S. Nayar's camera design.

According to an exemplary embodiment, the omnidirectional camera 230 includes a convex paraboloidal mirror 20 attached to a transparent acrylic dome 220, which is fastened to video camera 210. The omnidirectional camera 230 is supported by support post 240.

In a further exemplary embodiment, the camera 210 may comprise a 3-CCD color video camera (e.g., JVC KY-F70, 1360×1024 progressive pixels at 7.5 Hz), an NTSC-resolution 3-CCD color video camera (e.g., Hitachi HV-D25, 640×480 interlaced pixels at 30 Hz), or any other suitable type of still or video camera, as will be readily apparent to those ordinarily skilled in the art.

Exemplary Process for Calibrating the Camera System

Figure 3:
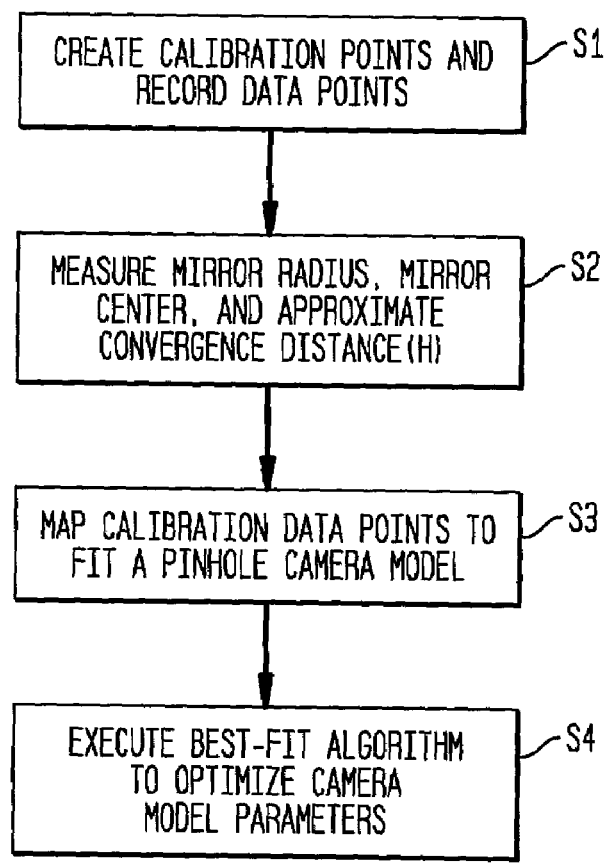
FIG. 3 is a flowchart illustrating the steps for calibrating the camera system.

FIG. 3 is a flowchart illustrating the four main steps for calibrating the catadioptric camera system 200. In step S1, calibration points are created. For each calibration point, the distance d of the point along with its projected position in image plane 25 is recorded (as shown in FIG. 2). The mirror radius in the image plane, the projected mirror center in the image plane, and an approximate convergence distance H are measured manually in step S2. Using these parameters, the calibration points are mapped in step S3 in order to make the catadioptric system 200 fit a pinhole camera model (as described below). In step S4, a best-fit optimization algorithm is performed to optimize the camera model parameters, based on the mapped calibration points.

System for Calibrating an Omnidirectional Camera

Figure 7:
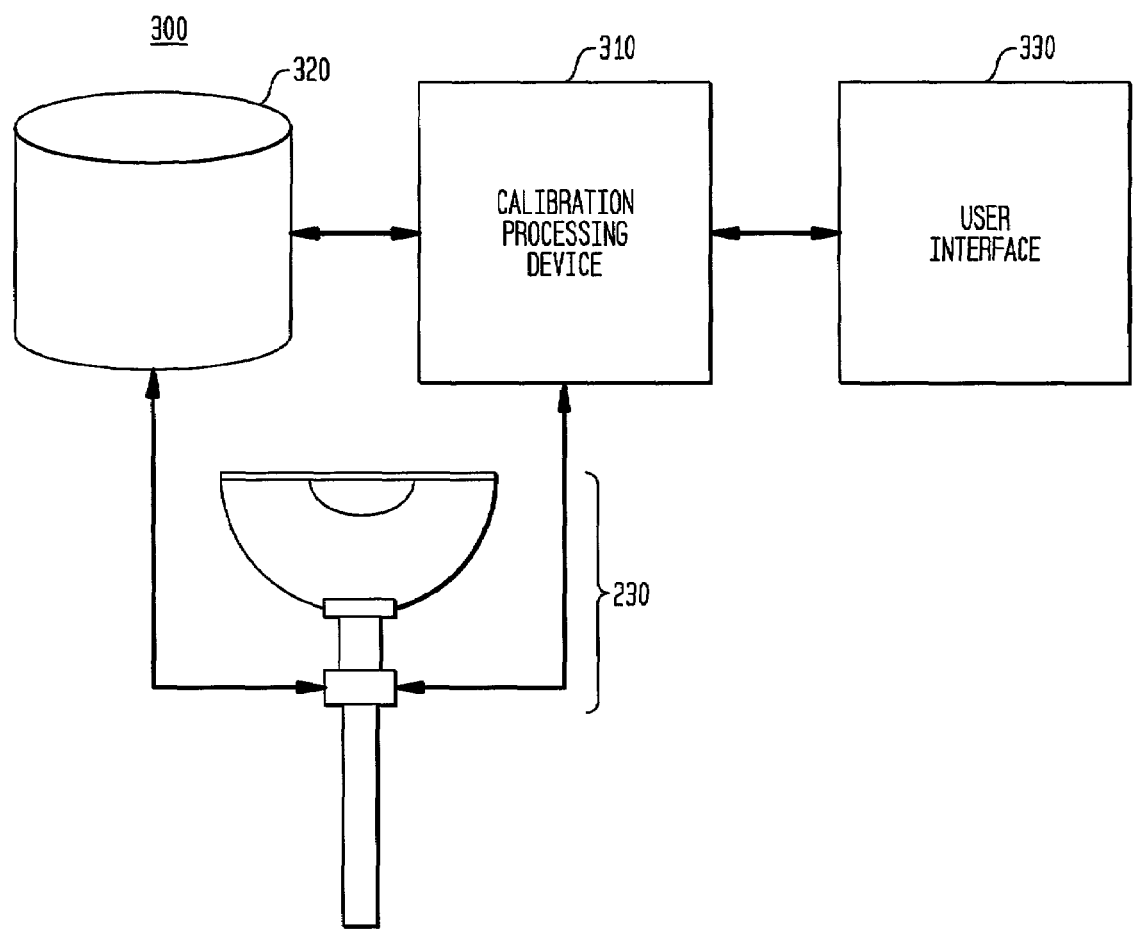
FIG. 7 illustrates a system for performing the calibration process of the present invention.

FIG. 7 is a block diagram of an exemplary system 300 implementing the calibration process illustrated in FIG. 3. Data storage device 320 stores the images recorded by the omnidirectional camera 230. Calibration processing device 310 is connected to both the data storage device 320 and the omnidirectional camera 230. The calibration processing device 310 also includes a user interface 330.

It should be noted that the system of FIG. 7 is merely illustrative, and should in no way be construed as limiting the present invention. For example, in the description given below, the functions ascribed to the calibration processing device 310 may be distributed among several different processing devices or platforms. Further, the data storage device 320 may be configured as a standalone device, or integrated into either the omnidirectional camera system 200 or the calibration processing device 310. The present invention includes any such modifications to the camera calibration system as will be contemplated by those skilled in the art.

Collecting Calibration Points (Step S1)

Calibration points are created in step Si by placing the camera system 200 in an environment at several positions and capturing images containing points from known 3D locations in the environment. According to an exemplary embodiment, these images are recorded in the data storage device 320.

Figure 6:
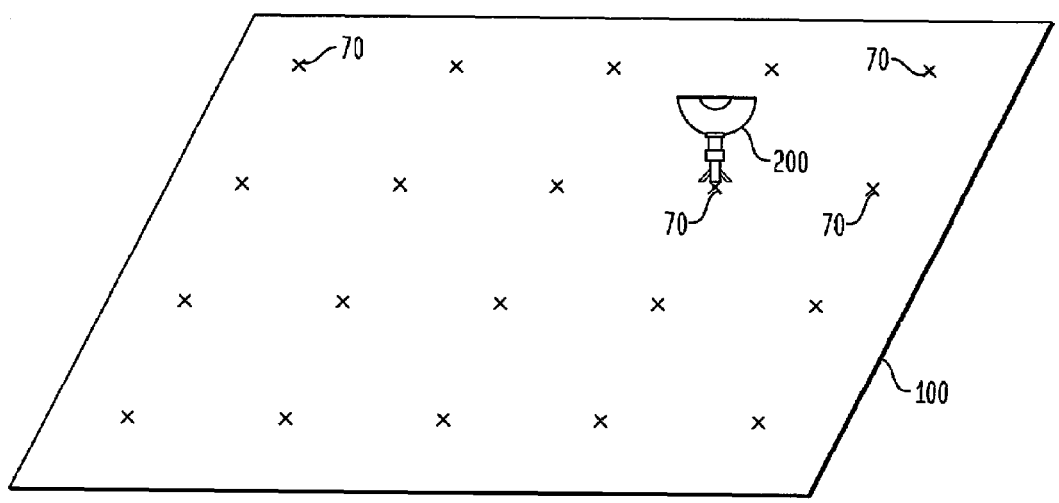
FIG. 6 illustrates the process of obtaining calibration points for the camera system.

FIG. 6 illustrates the process for obtaining calibration points according to an exemplary embodiment. Several small and visually distinct features are placed in the environment (e.g., small bright light bulbs), or are chosen from the environment (e.g. corners, points, small objects). The camera system 200 is positioned at a plurality of locations 70, which are randomly (and approximately evenly) distributed within region 100. In a further exemplary embodiment, twenty (20) locations are used and four (4) environment features (e.g., small light bulbs) are used, thereby allowing for eighty (80) calibration points to be obtained.

For each location 70, the distance d in the reference plane from the focal point of the parabola 20 to each of the environment features is measured using, for example, plumb lines and tape measures. The calibration points are obtained by recording, at each location 70, both the measured distance d and the projected location in the image of each environment feature. In an exemplary embodiment, the distances d corresponding to the calibration points captured at a particular location 70 may be input at the user interface 330. The calibration processing device 310 then correlates and stores these distances d with the corresponding image stored in the data storage device 320.

Determining Initial Parameters of the Mirror (Step S2)

According to an exemplary embodiment of the present invention, the following procedure is used to determine an approximate convergence distance H, the projected mirror center in the image plane, and the mirror radius in the image plane, as indicated in step S2. The reference plane of the mirror 20 is placed substantially parallel to the ground plane and at a pre-measured height off the ground. A marker is slowly raised until the reflection of the marker falls off the edge of the mirror. At this point, the marker's height off the ground and the marker's distance d, as projected onto the reference plane, from the focal point FP of the parabola is measured. Both the measurements of height and distance d may be used to make a rough approximation of the convergence distance H of the reflected rays. These manual measurements are entered into the calibration processing device 310 via the user interface 330 in an exemplary embodiment.

Next, using a captured image, a circle is fit through multiple approximately evenly sampled mirror-edge pixels of the image (e.g., 20 pixels) and may be used to obtain the position of the mirror's center and the radius of the mirror, both as projected onto the image plane. The determination of the mirror center and radius from the captured image may be performed using the calibration processing device 310.

Mapping Calibration Points to Fit a Pinhole Camera Model (Step S3)

As indicated above, the calibration points are mapped in step S3 to fit a perspective-based camera model, such as the pinhole camera model. A detailed description of a pinhole camera model can be found in the paper by R. Tsai entitled, "A Versatile Camera Calibration Technique for High-Accuracy 3D Machine Vision Metrology Using Off-the-Shelf TV Cameras and Lenses," IEEE Journal on Robotics and Automation, RA-3:4, 1987, pp. 323-344, which is hereby incorporated by reference in its entirety (and included in Appendix A).

Similar to Tsai's pinhole camera model, the camera model of the present invention contains eleven variable parameters, including five internal and six external parameters. The internal parameters include the empirically measured center of the mirror 20 on the image plane (x and y parameters). The other internal parameters to be determined during optimization step S4 (FIG. 4) include:

Focal length (f): the distance between the point of convergence of the reflected rays and the image plane. This parameter is dependent on the convergence angle of the reflected light rays. If these reflected rays were exactly parallel (as assumed for an orthographic projection in the ideal model), the value f would go to infinity.

Radial lens distortion coefficient (k): a parameter used to define a first-order approximation to the radial component of lens distortion.

Uncertainty scale factor ($s_x$): a scale factor that compensates for a variety of factors (e.g., hardware timing mismatch between camera scanning hardware and image acquisition hardware, imprecision of scanning itself, etc.) that may change the effective size of the pixels in the image plane.

The six external parameters of the camera model, which are optimized, are:

Camera-to-world translation T=($t_x$, $t_y$, $t_z$): these parameters represent the offset between the image plane 25 and the mirror reference plane; and Camera-to-world rotation R=($r_x$, $r_y$, $r_z$): these parameters represent the rotation of the mirror reference plane with respect to an assumed coordinate frame of the real world environment. They may also indirectly account for rotation of the mirror 20 with respect to the image plane 25.

Figure 4:
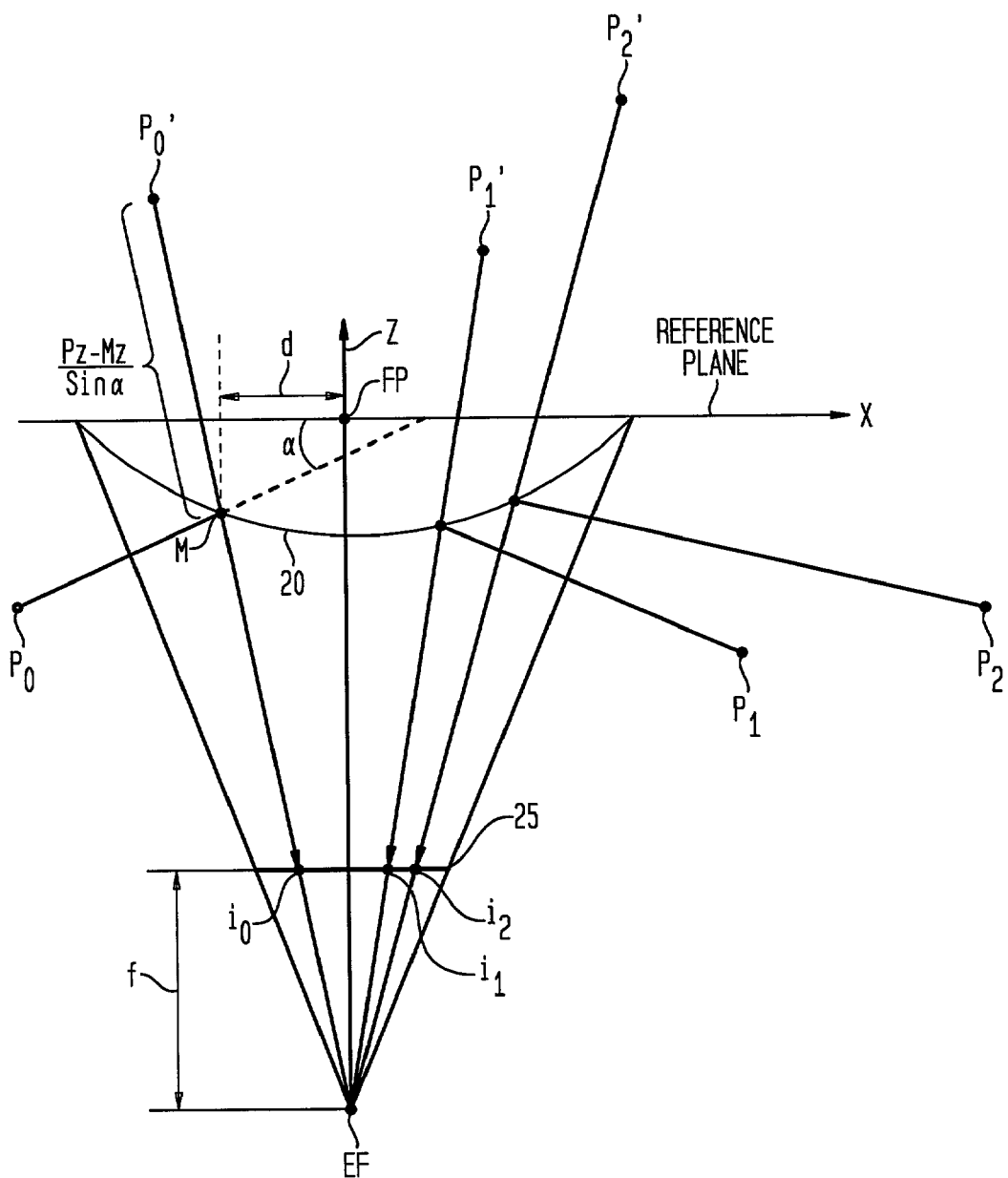
FIG. 4 illustrates mapped calibration points used to optimize parameters of the camera model.

FIG. 4 illustrates a situation where three calibration points $P_0$, $P_1$, $P_2$ are mapped to points $P_0'$, $P_1'$, $P_2'$ so as to fit a pinhole camera model. According to this model, the point at which the rays converge is an effective focal point EF of the catadioptric camera system 200. The focal length f is the distance between the image plane 25 and the effective focal point EF.

The position of each mapped calibration point is obtained using the equations (2) and (3) above. For example, to obtain $P_0'$, the estimated convergence distance H, mirror radius, and parameters $p_r$ and $p_z$ of $P_0$ are first substituted into equation (2) to determine the corresponding value of $m_r$. Then, $m_z$ is calculated using the parabola $$m_z = \frac{m_r^2}{2r} - \frac{r}{2},$$

and the distance d for $P_0$ is obtained from equation (3). The position $P_0'$ is then obtained by extending its reflected ray past its reflection point M by a distance equal to the distance from point M to the actual environment feature, namely ($p_z - m_z$)/sin($\alpha$) (where a is the angle of the ray emanating from $P_0$ with the reference plane). The position for the other mapped points $P_1'$ and $P_2'$ in FIG. 4 can be obtained using the same technique described for $P_0'$. In an exemplary embodiment, these calculations are performed by the calibration processing device 310.

Optimizing the Pinhole Camera Model Parameters (Step S4)

In the pinhole camera model, the mapped position $P_n'$ of a calibration point $P_n$ is transformed to its projected position $I_n$ on the image plane 25 based on the nine model parameters optimized in step S4. The equations describing these transformations, from which these model parameters can be recovered, are well known in the art. Tsai's aforementioned article, which is included in Appendix A, describes such equations.

During the optimization loop of step S4, which is also performed in the calibration processing device in an exemplary embodiment, the values of the nine internal and external parameters are determined so that the model best fits the measured calibration points. An initial prediction of the model parameter values is made, based in part on the manually determined values in step S2. These predicted values are plugged into the above-described transformation equations of the pinhole camera model to determine their fitness. If the fitness satisfies pre-determined criteria, then optimization of the parameter values is complete, and processing terminates. Otherwise, the algorithm adjusts the predicted values of the parameters according to the fit, and, accordingly, the convergence distance value H. Using the adjusted value of H, the mapped positions $P_n'$ of all of the calibration A points are recalculated. Then, the steps of determining the fitness and readjusting the parameter values are repeated until the convergence criteria is satisfied (see below).

The fit may be measured by determining how well the predicted values, which use the model parameters, fit the measured calibration points. Specifically, the method of least squares may be used to calculate the sum of the squared differences between the projected positions of the calibration features, obtained using the model equations, and the projected positions measured manually during step S1.

It should be noted that the convergence distance H and the mapped calibration points $P_n'$ need not be recomputed during every pass of the algorithm. It will be readily apparent to those skilled in the art that these values can be altered less frequently, e.g., during every other pass, every fourth pass, etc.

Optimization algorithms for best fitting the model parameters to the set of measured calibration points are well known in the art. Such algorithms are provided in Chapter 15, pages 656-706, of Numerical Recipes in C by W. Press, et al., Second Edition, Cambridge University Press, 1999, which is hereby incorporated by reference. Other optimization methods may be used, as will be readily apparent to those ordinarily skilled in the art.

Multiple-Pass Calibration Process

According to an exemplary embodiment of the present invention, multiple passes of the calibration process in FIG. 3 may be performed. In the first pass, steps S1-S4 are performed, as described above. After convergence of the model parameters is obtained, the convergence distance H approximation is altered (using the optimized model parameters). The radius $r_{180}$ of the mirror 20 that exactly reflects 180 degrees is then calculated based on the convergence distance H, using equation (4) above.

After the value $r_{180}$ is computed, the mirror 20 and lens hardware settings are conservatively adjusted to maximize the image space used by the portion of the mirror reflecting 180 degrees of the FOV. Then each step of the calibration process in FIG. 3 is performed again using the reconfigured camera system 200. This process may be repeated several times.

The user may control the calibration process using the user interface 330. For example, the user may determine the number of passes associated with the calibration process, instruct the calibration processing device 310 to perform the next pass after the mirror 20 and lens settings have been adjusted, etc.

Applications for the Camera Model

An omnidirectional camera system 200 calibrated according to the present invention may be used for a variety of applications, including applications in computer vision and computer graphics. In particular, this invention permits accurate camera pose estimation algorithms to be applied to the camera 200. Such algorithms may use the calibrated model to obtain distance estimates between the camera and objects in the environment. These distances may in turn be used to triangulate the camera's pose, or used in other pose estimation calculations as contemplated by those ordinarily skilled in the art. In an exemplary embodiment, the calibration processing device may be programmed to further perform the camera pose estimation algorithm. Alternatively, pose estimation may be executed using another processing device or system connected to the omnidirectional camera 230.

The applications described above are merely illustrative, and neither the present invention, nor any camera utilizing the present invention, should be construed as being limited to any particular type of application.

The invention being thus described, it will be apparent that the same may be varied in many ways. Such variations are not to be regarded as a departure from the spirit and scope of the invention, and all such modifications as would be readily apparent to one skilled in the art are intended to be included within the scope of the following claims.

APPENDIX A

A Versatile Camera Calibration Technique for High-Accuracy 3D Machine Vision Metrology Using Off-the-Shelf TV Cameras and Lenses

ROGER Y. TSAI

*Abstract*—A new technique for three-dimensional (3D) camera calibration for machine vision metrology using off-the-shelf TV cameras and lenses is described. The two-stage technique is aimed at efficient computation of camera external position and orientation relative to object reference coordinate system as well as the effective focal length, radial lens distortion, and image scanning parameters. The two-stage technique has advantage in terms of accuracy, speed, and versatility over existing state of the art. A critical review of the state of the art is given in the beginning. A theoretical framework is established, supported by comprehensive proof in five appendixes, and may pave the way for future research on 3D robotics vision. Test results using real data are described. Both accuracy and speed are reported. The experimental results are analyzed and compared with theoretical prediction. Recent effort indicates that with slight modification, the two-stage calibration can be done in real time.

I. INTRODUCTION

A. The Importance of Versatile Camera Calibration Technique

CAMERA CALIBRATION in the context of three-dimensional (3D) machine vision is the process of determining the internal camera geometric and optical characteristics (intrinsic parameters) and/or the 3D position and orientation of the camera frame relative to a certain world coordinate system (extrinsic parameters), for the following purposes.

*1) Inferring 3D Information from Computer Image Coordinates:* There are two kinds of 3D information to be inferred. They are different mainly because of the difference in applications.

a) The first is 3D information concerning the location of the object, target, or feature. For simplicity, if the object is a point feature (e.g., a point spot on a mechanical part illuminated by a laser beam, or the corner of an electrical component on a printed circuit board), camera calibration provides a way of determining a ray in 3D space that the object point must lie on, given the computer image coordinates. With two views either taken from two cameras or one camera in two locations, the position of the object point can be determined by intersecting the two rays. Both intrinsic and extrinsic parameters need to be calibrated. The applications include mechanical part dimensional measurement, automatic assembly of mechanical or electronics components, tracking, robot calibration and trajectory analysis. In the above applications, the camera calibration need be done only once.

b) The second kind is 3D information concerning the position and orientation of moving camera (e.g., a camera held by a robot) relative to the target world coordinate system. The applications include robot calibration with camera-on-robot configuration, and robot vehicle guidance.

*2) Inferring 2D Computer Image Coordinates from 3D Information:* In model-driven inspection or assembly applications using machine vision, a hypothesis of the state of the world can be verified or confirmed by observing if the image coordinates of the object conform to the hypothesis. In doing so, it is necessary to have both the intrinsic and extrinsic camera model parameters calibrated so that the two-dimensional (2D) image coordinate can be properly predicted given the hypothetical 3D location of the object.

The above purposes can be best served if the following criteria for the camera calibration are met.

*1) Autonomous:* The calibration procedure should not require operator intervention such as giving initial guesses for certain parameters, or choosing certain system parameters manually.

*2) Accurate:* Many applications such as mechanical part inspection, assembly, or robot arm calibration require an accuracy that is one part in a few thousand of the working range. The camera calibration technique should have the potential of meeting such accuracy requirements. This requires that the theoretical modeling of the imaging process must be accurate (should include lens distortion and perspective rather than parallel projection).

*3) Reasonably Efficient:* The complete camera calibration procedure should not include high dimension (more than five) nonlinear search. Since type b) application mentioned earlier needs repeated calibration of extrinsic parameters, the calibration approach should allow enough potential for high-speed implementation.

*4) Versatile:* The calibration technique should operate uniformly and autonomously for a wide range of accuracy requirements, optical setups, and applications.

*5) Need Only Common Off-the-Shelf Camera and Lens:* Most camera calibration techniques developed in the photogrammetric area require special professional cameras and processing equipment. Such requirements prohibit full automation and are labor-intensive and time-consuming to ---
Manuscript received October 18, 1985; revised September 2, 1986. A version of this paper was presented at the 1986 IEEE International Conference on Computer Vision and Pattern Recognition and received the Best Paper Award.

The author is with the IBM T. J. Watson Research Center, Yorktown Heights, NY 10598.

IEEE Log Number 8613011.

implement.[1] The advantages of using off-the-shelf solid state or vidicon camera and lens are

- versatile—solid state cameras and lenses can be used for a variety of automation applications;
- availability—since off-the-shelf solid state cameras and lenses are common in many applications, they are at hand when you need them and need not be custom ordered;
- familiarity, user-friendly—not many people have the experience of operating the professional metric camera used in photogrammetry or the tetralateral photodiode with preamplifier and associated electronics calibration, while solid state is easily interfaced with a computer and easy to install.

The next section shows deficiencies of existing techniques in one or more of these criteria.

B. Why Existing Techniques Need Improvement

In this section, existing techniques are first classified into several categories. The strength and weakness of each category are analyzed.

*Category I—Techniques Involving Full-Scale Nonlinear Optimization:* See [1]–[3], [7], [10], [14], [17], [22], [30], for example.

*Advantage:* It allows easy adaptation of any arbitrarily accurate yet complex model for imaging. The best accuracy obtained in this category is comparable to the accuracy of the new technique proposed in this paper.

*Problems:* 1) It requires a good initial guess to start the nonlinear search. This violates the principle of automation. 2) It needs computer-intensive full-scale nonlinear search.

*Classical Approach:* Faig's technique [7] is a good representative for these techniques. It uses a very elaborate model for imaging, uses at least 17 unknowns for each photo, and is very computer-intensive [7]. However, because of the large number of unknowns, the accuracy is excellent. The rms (root mean square or average) error can be as good as 0.1 mil. However, this rms error is in photo scale (i.e., error of fitting the model with the observations in image plane). When transformed into 3D error, it is comparable to the average error (0.5 mil) obtained using monoview multiplane calibration technique, which is the typical case among the various two-stage techniques proposed in this paper. Another reason why such photogrammetric techniques produce very accurate results is that large professional format photo is used rather than solid-state image array such as CCD. The resolution for such photos is generally three to four times better than that for the solid-state imaging sensor array.

*Direct linear transformation (DLT):* Another example is the direct linear transformation (DLT) developed by Abdel-Aziz and Karara [1], [2]. One reason why DLT was developed is that only linear equations need be solved. However, it was later found that, unless lens distortion is ignored, full-scale nonlinear search is needed. In [14, p. 36] Karara, the co- ---
[1] Although existing techniques such as direct linear transformation' (see Section I-B) can be implemented using common solid state or vidicon cameras, the version NBS implemented uses high resolution analog tetralateral photodiode, and the associated optoelectronics accessories need special manual calibration (see [5] for details).

inventor of DLT, comments,

> When originally presented in 1971 (Abdel-Aziz and Karara, 1971), the DLT basic equations did not involve any image refinement parameters, and represented an actual linear transformation between comparator coordinates and object-space coordinates. When the DLT mathematical model was later expanded to encompass image refinement parameters, the title DLT was retained unchanged.

Although Wong [30] mentioned that there are two possible procedures of using DLT (one entails solving linear equations only, and the other requires nonlinear search), the procedure using linear equation solving actually contains approximation. One of the artificial parameters he introduced, $\kappa_1$, is a function of $(x, y, z)$ world coordinate and therefore not a constant. Nevertheless, DLT bridges the gap between photogrammetry and computer vision so that both areas can use DLT directly to solve camera calibration problem.

When lens distortion is not considered, DLT falls into the second category (to be discussed later) that entails solving linear equations only. It, too, has its pros and cons and will be discussed later when the second category is presented. Dainis and Juberts [5] from the Manufacturing Engineering Center of NBS reported results using DLT for camera calibrations to do accurate measurement of robot trajectory motion. Although the NBS system can do 3D measurement at a rate of 40 Hz, the camera calibration was not and need not be done in real time. The accuracy reported uses the same type of measure for accessing or evaluating camera calibration accuracy as Type I measure used in this paper (see Section III-A). The total accuracy in 3D is one part in 2000 within the center 80 percent of the detector field of view. This is comparable to the accuracy of the proposed two-stage method in measuring the $x$ and $y$ parts of the 3D coordinates (the proposed two-stage technique yields better percentage accuracy for the depth). Notice, however, that the image sensing device NBS used is not a TV camera but a tetralateral photodiode. It senses the position of incidence light spot on the surface of detector by means of analog and uses a 12-bit A/D converter to convert the analog positions into a digital quantity to be processed by the computer. Therefore, the tetralateral photodiode has an effective 4K × 4K spatial resolution, as opposed to a 388 × 480 full-resolution Fairchild CCD area sensor. Many thought that the low resolution characteristics of solid-state imaging sensor could not be used for high-accuracy 3D metrology. This paper reveals that with proper calibration, a solid-state sensor (such as CCD) is still a valid tool in high-accuracy 3D machine vision metrology applications. Dainis and Juberts [5] mentioned that the accuracy is 100 percent lower for points outside the center 90-percent field of view. This suggests that lens distortion is not considered when using DLT to calibrate the camera. Therefore, only linear equations need to be solved. This actually puts the NBS work in a different category that follows which include all techniques that computes the perspective transformation matrix first. Again, the pros and cons for the latter will be discussed later.

*Sobel, Gennery, Lowe:* Sobel [23] described a system for calibrating a camera using nonlinear equation solving. Eighteen parameters must be optimized. The approach is were reported. Gennery [10] described a method that finds camera parameters iteratively by minimizing the error of epipolar constraints without using 3D coordinates of calibration points. It is mentioned in [4, p. 253] and [20, p. 50] that the technique is too error-prone.

*Category II—Techniques Involving Computing Perspective Transformation Matrix First Using Linear Equation Solving:* See [1], [2], [9], [11], [14], [24], [25], and [31], for example.

*Advantage:* No nonlinear optimization is needed.

*Problems:* 1) Lens distortion cannot be considered. 2) The number of unknowns in linear equations is much larger than the actual degrees of freedom (i.e., the unknowns to be solved are not linearly independent). The disadvantage of such redundant parameterization is that erroneous combination of these parameters can still make a good fit between experimental observations and model prediction in real situation when the observation is not perfect. This means the accuracy potential is limited in noisy situation.

Although the equations characterizing the transformation from 3D world coordinates to 2D image coordinates are nonlinear functions of the extrinsic and intrinsic camera model parameters (see Section II-C1 and -2 for definition of camera parameters), they are linear if lens distortion is ignored and if the coefficients of the 3 × 4 perspective transformation matrix are regarded as unknown parameters (see Duda and Hart [6] for a definition of perspective transformation matrix). Given the 3D world coordinates of a number of points and the corresponding 2D image coordinates, the coefficients in the perspective transformation matrix can be solved by least square solution of an overdetermined systems of linear equations. Given the perspective transformation matrix, the camera model parameters can then be computed if needed. However, many investigators have found that ignoring lens distortion is unacceptable when doing 3D measurement (e.g., Itoh et al. [12], Luh and Klaasen [16]). The error of 3D measurement reported in this paper using two-stage camera calibration technique would have been an order of magnitude larger if the lens distortion were not corrected.

*Sutherland:* Sutherland [25] formulated very explicitly the procedure for computing the perspective transformation matrix given 3D world coordinates and 2D image coordinates of a number of points. It was applied to graphics applications, and no accuracy results are reported.

*Yakimovsky and Cunningham:* Yakimovsky and Cunningham's stereo program [31] was developed for the JPL Robotics Research Vehicle, a testbed for a Mars rover and remote processing systems. Due to the narrow field of view and large object distance, they used a highly linear lens and ignored distortion. They reported that the 3D measurement accuracy of ±5 mm at a distance of 2 m. This is equivalent to a depth resolution of one part in 400, which is one order of magnitude less accurate than the test results to be described in this paper. One reason is that Yakimovsky and Cunningham's system does not consider lens distortion. The other reason is probably that the unknown parameters computed by linear equations are not linearly independent. Notice also that had it not been for the fact that the field of view in Yakimovsky and Cunningham's system is narrow and that the object distance is large, ignoring distortion should cause more error.

*DLT:* By disregarding lens distortion, DLT developed by Abdel-Aziz and Karara [1], [2] described in Category I falls into Category II. Accuracy results on real experiments have been reported only by Dainis and Juberts from NBS [5]. The accuracy results and the comparison with the proposed technique are described earlier in Category I.

*Hall et al.:* Hall et al. [11] used a straightforward linear least square technique to solve for the elements of perspective transformation matrix for doing 3D curved surface measurement. The computer 3D coordinates were tabulated, but no ground truth was given, and therefore the accuracy is unknown.

*Ganapathy, Strat:* Ganapathy [9] derived a noniterative technique in computing camera parameters given the perspective transformation matrix computed using any of the techniques discussed in this category. He used the perspective transformation matrix given from Potmesil through private communications and computed the camera parameters. It was not applied to 3D measurement, and therefore no accuracy results were available. Similar results are obtained by Strat [24].

*Category III—Two-Plane Method:* See [13] and [19] for example.

*Advantage:* Only linear equations need be solved.

*Problems:* 1) The number of unknowns is at least 24 (12 for each plane), much larger than the degrees of freedom. 2) The formula used for the transformation between image and object coordinates is empirically based only.

The two-plane method developed by Martins et al. [19] theoretically can be applied in general without having any restrictions on the extrinsic camera parameters. However, for the experimental results reported, the relative orientation between the camera coordinate system and the object world coordinate system was assumed known (no relative rotation). In such a restricted case, the average error is about 4 mil with a distance of 25 in, which is comparable to the accuracy obtained using the proposed technique. Since the formula for the transformation between image and object coordinates is empirically based, it is not clear what kind of approximation is assumed. Nonlinear lens distortion theoretically cannot be corrected. A general calibration using the two-plane technique was proposed by Isaguirre et al. [13]. Full-scale nonlinear optimization is needed. No experimental results were reported.

*Category IV—Geometric Technique:* See [8] for example.

*Advantage:* No nonlinear search is needed.

*Problems:* 1) No lens distortion can be considered. 2) Focal length is assumed given. 3) Uncertainty of image scale factor is not allowed.

Fischler and Bolles [8] use a geometric construction to derive direct solution for the camera locations and orientation. However, none of the camera intrinsic parameters (see Section II-C2) can be computed. No accuracy results of real 3D measurement was reported.

II. THE NEW APPROACH TO MACHINE VISION CAMERA CALIBRATION USING A TWO-STAGE TECHNIQUE

In the following, an overview is first given that describes the strategy we took in approaching the problem. After the overview, the underlying camera model and the definition of the parameters to be calibrated are described. Then, the calibration algorithm and the theoretical derivation and other issues will be presented. For those readers who would like to have a physical feeling of how to perform calibration in a real setup, first read "Experimental Procedure," Section IV-A1.

A. Overview

Camera calibration entails solving for a large number of calibration parameters, resulting in the classical approach mentioned in the Introduction that requires large scale nonlinear search. The conventional way of avoiding this large-scale nonlinear search is to use the approaches similar to DLT described in the Introduction that solves for a set of parameters (coefficients of homogeneous transformation matrix) with linear equations, ignoring the dependency between the parameters, resulting in a situation with the number of unknowns greater than the number of degrees of freedoms. The lens distortion is also ignored (see the Introduction for more detail). Our approach is to look for a real constraint or equation that is only a function of a subset of the calibration parameters to reduce the dimensionality of the unknown parameter space. It turns out that such constraint does exist, and we call it the *radial alignment constraint* (to be described later). This constraint (or equations resulting from such physical constraint) is only a function of the relative rotation and translation (except for the z component) between the camera and the calibration points (see Section II-B for detail). Furthermore, although the constraint is a nonlinear function of the abovementioned calibration parameters (called group I parameters), there is a simple and efficient way of computing them. The rest of the calibration parameters (called group II parameters) are computed with normal projective equations. A very good initial guess of group II parameters can be obtained by ignoring the lens distortion and using simple linear equation with two unknowns. The precise values for group II parameters can then be computed with one or two iterations in minimizing the perspective equation error. Be aware that when single-plane calibration points are used, the plane must not be exactly parallel to image plane (see (15), to follow, for detail).

Due to the accurate modeling for the image-to-object transformation described in the next section, subpixel accuracy interpolation for extracting image coordinates of calibration points can be used to enhance the calibration accuracy to maximum. Note that this is not true if a DLT-type linear approximation technique is used since ignoring distortion results in image coordinate error more than a pixel unless very narrow angle lens is used. One way of achieving subpixel accuracy image feature extraction is described in Section IV-A1.

B. The Camera Model

This section describes the camera model, defines the calibration parameters, and presents the simple radial align-

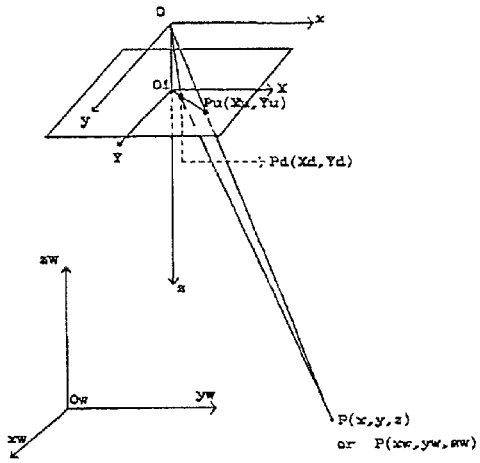

Fig. 1. Camera geometry with perspective projection and radial lens distortion.

ment principle (to be described in Section II-E) that provides the original motivation for the proposed technique. The camera model itself is basically the same as that used by any of the techniques in Category I in Section I-B.

*1) The Four Steps of Transformation from 3D World Coordinate to Camera Coordinate:* Fig. 1 illustrates the basic geometry of the camera model. $(x_w, y_w, z_w)$ is the 3D coordinate of the object point $P$ in the 3D world coordinate system. $(x, y, z)$ is the 3D coordinate of the object point $P$ in the 3D camera coordinate system, which is centered at point $O$, the optical center, with the z axis the same as the optical axis. $(X, Y)$ is the image coordinate system centered at $O_i$ (intersection of the optical axis $z$ and the front image plane) and parallel to $x$ and $y$ axes. $f$ is the distance between front image plane and the optical center. $(X_u, Y_u)$ is the image coordinate of $(x, y, z)$ if a perfect pinhole camera model is used. $(X_d, Y_d)$ is the actual image coordinate which differs from $(X_u, Y_u)$ due to lens distortion. However, since the unit for $(X_f, Y_f)$, the coordinate used in the computer, is the number of pixels for the discrete image in the frame memory, additional parameters need be specified (and calibrated) that relates the image coordinate in the front image plane to the computer image coordinate system. The overall transformation from $(x_w, y_w, z_w)$ to $(X_f, Y_f)$ is depicted in Fig. 2. Step 4 is special to industrial machine vision application where TV cameras (particularly solid-state CCD or CID) are used. The following is the transformation in analytic form for the four steps in Fig. 2.

*Step 1:* Rigid body transformation from the object world coordinate system $(x_w, y_w, z_w)$ to the camera 3D coordinate system $(x, y, z)$ $$\begin{bmatrix} x \\ y \\ z \end{bmatrix} = R \begin{bmatrix} x_w \\ y_w \\ z_w \end{bmatrix} + T \qquad (1)$$

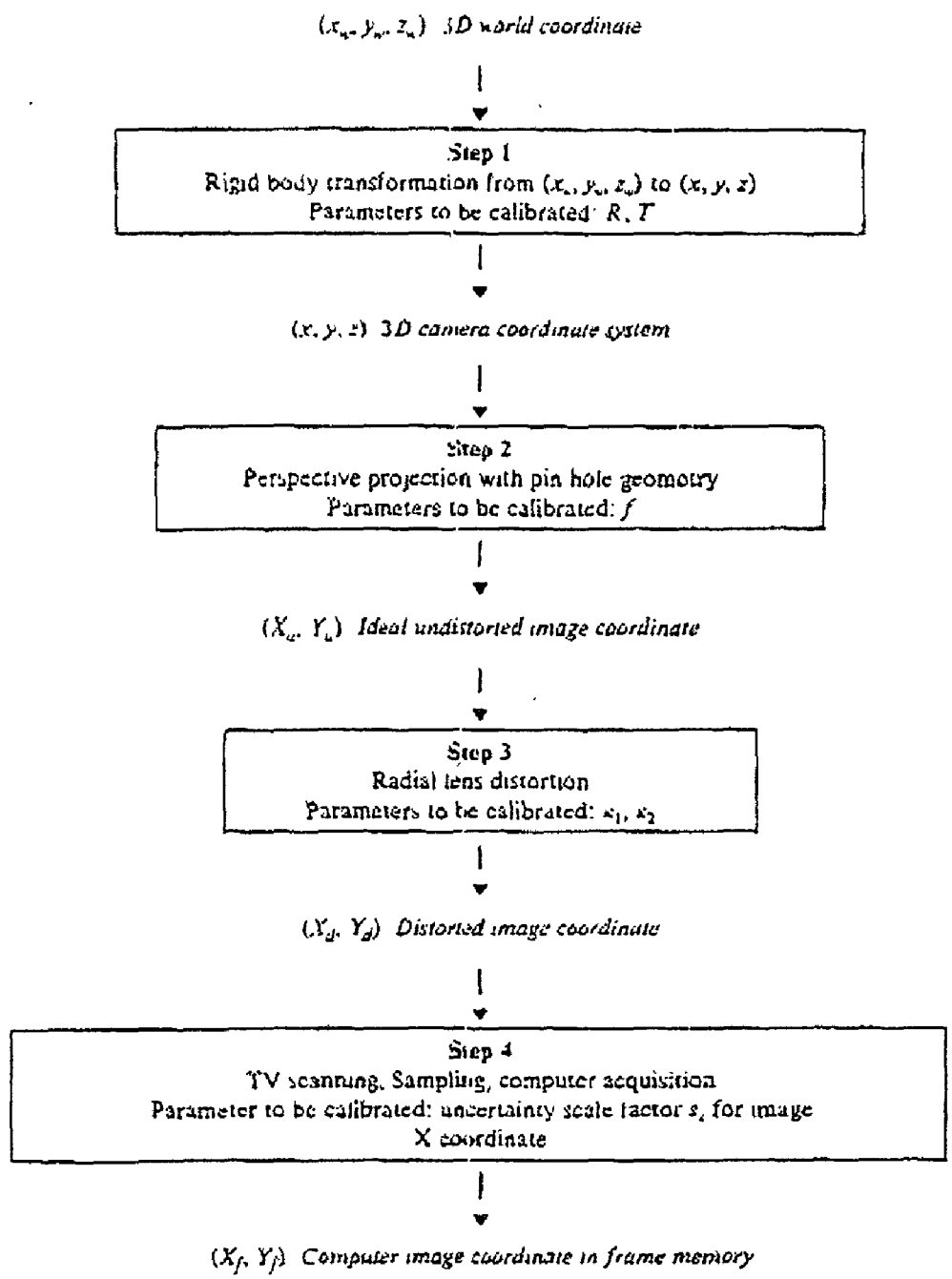
Fig. 2  Four steps of transformation from 3D world coordinate to computer image coordinate.

The parameters to be calibrated are distortion coefficients $\kappa_i$.

The modeling of lens distortion can be found in [18]. There are two kinds of distortion: radial and tangential. For each kind of distortion, an infinite series is required. However, my experience shows that for industrial machine vision application, only radial distortion needs to be considered, and only one term is needed. Any more elaborate modeling not only would not help but also would cause numerical instability.

*Step 4:* Real image coordinate $(X_d, Y_d)$ to computer image coordinate coordinate $(X_f, Y_f)$ transformation $$X_f = s_x d_x'^{-1} X_d + C_x \quad (6a)$$

$$Y_f = d_y^{-1} Y_d + C_y \quad (6b)$$

where $(X_f, Y_f)$ row and column numbers of the image pixel in computer frame memory, $(C_x, C_y)$ row and column numbers of the center of computer frame memory, (6c)

$$d_x' = d_x \frac{N_{cx}}{N_{fx}} \quad (6d)$$

$d_x$ center to center distance between adjacent sensor elements in $X$ (scan line) direction, (6e)

$d_y$ center to center distance between adjacent CCD sensor in the $Y$ direction, (6f)

$N_{cx}$ number of sensor elements in the $X$ direction, (6g)

$N_{fx}$ number of pixels in a line as sampled by the computer. (6h)

The parameter to be calibrated is the uncertainty image scale factor $s_x$.

To transform between the computer image coordinate (in the forms of rows and columns in frame buffer) and the real image coordinate, obviously the distances between the two adjacent pixels in both the row and column direction in the frame buffer mapped to the real image coordinates need be used. When a vidicon camera is used where both such distances are not known *a priori*, the multiplane (rather than single plane) calibration technique described in this paper must be used. However, the scale in $y$ is absorbed by the focal length since focal length scales the image in both the $x$ and $y$ directions. Therefore, $d_y$ (6b) should be set to one while the computed focal length $f$ will be a product of the actual focal length and the scale factor in $y$. Also, $N_{cx}$ and $N_{fx}$ in (6d) should be set to one since they only apply to CCD cameras.

Note that if a vidicon type camera is used, the sensor element or pixel mentioned earlier should be regarded as each individual resolution element in the receptor area with the resolution being determined by the sampling rate. If a solid-state CCD or CID discrete array sensor is used and if full resolution is used, since the image is scanned line by line, obviously the distance between adjacent pixels in the $y$ direction is just the same as $d_y$, center to center distance between adjacent CCD sensor elements in $Y$ direction. Therefore, (6b) is the right relationship between $Y_d$ and $Y$. If only the odd or the even field is used, then $d_y$ is twice the center-to-center distance between adjacent CCD sensor elements in the $Y$ direction. The situation in $X$ is different. Normally, in TV camera scanning, an analog waveform is generated for each image line by zeroth-order sample and hold. Then it is sampled by the computer into $N_{fx}$ samples. Therefore, one would easily draw the conclusion that $$X = \frac{X_d N_{fx}}{d_x N_{cx}}.$$

Normally, manufacturers of CCD cameras supply information of $d_x$ and $d_y$ (defined in (6e) and (6f)) to submicron accuracy. However, an additional uncertainty parameter has to be introduced. This is due to a variety of factors, such as slight hardware timing mismatch between image acquisition hardware and camera scanning hardware, or the imprecision of the timing of TV scanning itself. Even a one-percent difference can cause three- to five-pixels error for a full resolution frame. Our experience with the Fairchild CCD 3000 camera shows that the uncertainty is as much as five-percent. Therefore, an unknown parameter $s_x$ in (6a) is introduced to accommodate this uncertainty, and to include it in the list of unknown parameters to be calibrated, multiplane calibration technique described in this paper should be used. However, there are a variety of other simple techniques one can use to determine this scale factor in advance (see Lenz and Tsai [28]). In this case, the single plane calibration technique suffices. The issue of $(C_x, C_y)$ will be discussed later (see Note at end of paper).

*C. Equations Relating the 3D World Coordinates to the 2D Computer Image Coordinates*

By combining the last three steps, the $(X, Y)$ computer coordinate is related to $(x, y, z)$, the 3D coordinate of the object point in camera coordinate system, by the following equation:

$$s_x^{-1} d_x' X + s_x^{-1} d_x' X \kappa_1 r^2 = f \frac{x}{z} \quad (7a)$$

$$d_y' Y + d_y Y \kappa_1 r^2 = f \frac{y}{z} \quad (7b)$$

where $$r = \sqrt{(s_x^{-1} d_x' X)^2 + (d_y Y)^2}.$$

Substituting (1) into (7a) and (7b) gives $$s_x^{-1} d_x' X + s_x^{-1} d_x' X \kappa_1 r^2 = f \frac{r_1 x_w + r_2 y_w + r_3 z_w + T_x}{r_7 x_w + r_8 y_w + r_9 z_w + T_z}$$

(8a)

$$d_y' Y + d_y Y \kappa_1 r^2 = f \frac{r_4 x_w + r_5 y_w + r_6 z_w + T_y}{r_7 x_w + r_8 y_w + r_9 z_w + T_z} \quad (8b)$$

where $$r = \sqrt{(s_x^{-1} d_x' X)^2 + (d_y Y)^2}.$$

The parameters used in the transformation in Fig. 2 can be categorized into the following two classes:

*1) Extrinsic Parameters:* The parameters in Step 1 in Fig. 2 for the transformation from 3D object world coordinate system to the camera 3D coordinate system centered at the optical center are called the *extrinsic parameters*. There are six extrinsic parameters: the Euler angles yaw $\theta$, pitch $\phi$, and tilt $\psi$ for rotation, the three components for the translation vector $T$. The rotation matrix $R$ can be expressed as function of $\theta$, $\phi$, and $\psi$ as follows:

$$R = \begin{bmatrix} \cos\psi\cos\theta & \sin\psi\cos\theta & -\sin\theta \\ -\sin\psi\cos\phi + \cos\psi\sin\theta\cos\phi & \cos\psi\cos\phi + \sin\psi\sin\theta\sin\phi & \cos\theta\sin\phi \\ \sin\psi\sin\phi + \cos\psi\sin\theta\cos\phi & -\cos\psi\sin\phi + \sin\psi\sin\theta\cos\phi & \cos\theta\cos\phi \end{bmatrix}. \quad (9)$$

*2) Intrinsic Parameters:* The parameters in Steps 2–4 in Fig. 2 for the transformation from 3D object coordinate in the camera coordinate system to the computer image coordinate are called the *intrinsic parameters*. There are six intrinsic parameters:

- $f$        effective focal length, or image plane to projective center distance,
- $\kappa_1$    lens distortion coefficient,
- $s_x$      uncertainty scale factor for $x$, due to TV camera scanning and acquisition timing error,
- $(C_x, C_y)$  computer image coordinate for the origin in the image plane.

D. Problem Definition

The problem of camera calibration is to compute the camera intrinsic and extrinsic parameters based on a number of points whose object coordinates in the $(x_w, y_w, z_w)$ coordinate system are known and whose image coordinates $(X, Y)$ are measured.

E. The New Two-Stage Camera Calibration Technique: Motivation

The original basis of the new technique is the following four observations.

*Observation I:* Since we assume that the distortion is radial, no matter how much the distortion is, the direction of the vector $\overline{O_i P_d}$ extending from the origin $O_i$ in the image plane to the image point $(X_d, Y_d)$ remains unchanged and is radially aligned with the vector $\overline{P_{oz} P}$ extending from the optical axis (or, more precisely, the point $P_{oz}$ on the optical axis whose $z$ coordinate is the same as that for the object point $(x, y, z)$) to the object point $(x, y, z)$. This is illustrated in Fig. 3. See Appendix I for a geometric and an algebraic proof of the radial alignment constraint (RAC).

*Observation II:* The effective focal length $f$ also does not influence the direction of the vector $\overline{O_i P_d}$, since $f$ scales the image coordinate $X_d$ and $Y_d$ by the same rate.

*Observation III:* Once the object world coordinate system is rotated and translated in $x$ and $y$ as in step 1 such that $O_i P_d$ is parallel to $\overline{P_{oz} P}$ for every point, then translation in $z$ will not alter the direction of $\overline{O_i P_d}$ (this comes from the fact that, according to (4a) and (4b), $z$ changes $X_u$ and $Y_u$ by the same scale, so that $\overline{O_i P_u} // \overline{O_i P_d}$).

*Observation IV:* The constraint that $O_i P_d$ is parallel to $\overline{P_{oz} P}$ for every point, being shown to be independent of the radial distortion coefficients $\kappa_1$ and $\kappa_2$, the effective focal length $f$, and the $z$ component of 3D translation vector $T$, is actually sufficient to determine the 3D rotation $R$, $X$, and $Y$ component of 3D translation from the world coordinate system to the camera coordinate system, and the uncertainty scale factor $s_x$ in $X$ component of the image coordinate.

Among the four observations, the first three are clearly true, while the last one requires some geometric intuition and "imagination" to establish its validity. It is possible for the author to go into further details on how this intuition was reached, but it will not be sufficient for a complete proof. Rather, the complete proof will be given analytically in the next few sections. In fact, as we will see later, not only is the radial alignment constraint sufficient to determine uniquely the extrinsic parameters (except for $T_z$) and one of the intrinsic parameters ($s_x$), but also the computation entails only the solution of linear equations with five to seven unknowns. This means it can be done fast and done automatically since no initial guess, which is normally required for nonlinear optimization, is needed.

F. Calibrating a Camera Using a Monoview Coplanar Set of Points

To aid those readers who intend to implement the proposed technique in their applications, the presentation will be algorithm-oriented. The computation procedure for each individual step will first be given, while the derivation and other theoretical issues will follow. Most technical details appear in the Appendices.

Fig. 4 illustrates the setup for calibrating a camera using a monoview coplanar set of points. In the actual setup, the plane illustrated in the figure is the top surface of a metal block. The detailed description of the physical setup is given in Section IV-A1. Since the calibration points are on a common plane, the $(x_w, y_w, z_w)$ coordinate system can be chosen such that $z_w = 0$ and the origin is not close to the center of the view or $y$ axis of the camera coordinate system. Since the $(x_w, y_w, z_w)$ is user-defined and the origin is arbitrary, it is no problem setting the origin of $(x_w, y_w, z_w)$ to be out of the field of view and not close to the $y$ axis. The purpose for the latter is to make sure that $T_y$ is not *exactly* zero, so that the presentation of the computation procedure to be described in the following can be made more unified and simpler. (In case it is zero, it is quite straightforward to modify the algorithm but is unnecessary since it can be avoided.)

*1) Stage 1—Compute 3D Orientation, Position (x and y):*

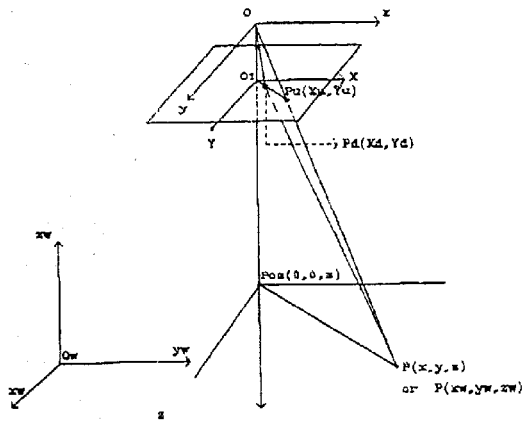

Fig. 3. Illustration of radial alignment constraint. Radial distortion does not alter direction of vector from origin to image point, which leads to $\overline{O_iP_d} \parallel \overline{O_iP_u} \parallel \overline{O_{oz}P}$.

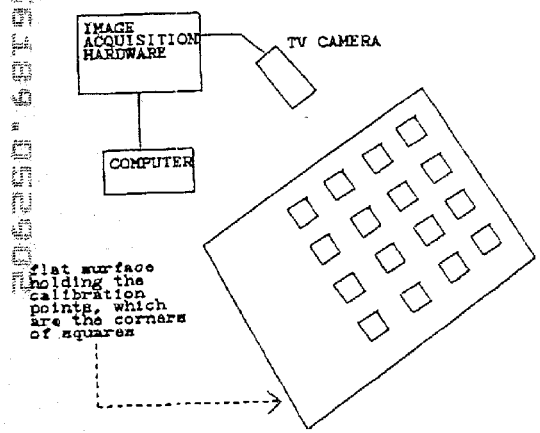

Fig. 4. Schematic diagram of experimental setup for camera calibration using monoview coplanar set of points.

a) Compute the distorted image coordinates $(X_d, Y_d)$:
Procedure:

i) Grab a frame into the computer frame memory. Detect the row and column number of each calibration point $i$. Call it $(X_{fi}, Y_{fi})$.

ii) Obtain $N_{cx}$, $N_{fx}$, $d'_x$, $d_y$ according to (6e)–(6h) using information of camera and frame memory supplied by manufacturer.

iii) Take $(C_x, C_y)$ to be the center pixel of frame memory (see $i$) in "Derivation and discussion" below).

iv) Compute $(X_{di}, Y_{di})$ using (6a) and (6b):

$$X_{di} = s_x^{-1} d'_x (X_{fi} - C_x)$$

$$Y_{di} = d_y (Y_{fi} - C_y)$$

for $i = 1, \cdots, N$, and $N$ is the total number of calibration points. See $ii$) in "Derivation and discussion below concerning $s_x$.

Derivation and discussion (also see Note at end of paper):

i) Issues concerning image origin: Currently, we do not include the image center $(C_x, C_y)$ in the list of camera parameters to be calibrated. We simply take the apparent center of the computer image frame buffer to be the center. The results of the real experiments show that when a full resolution CCD camera is calibrated with the proposed technique, it is so well equipped as to be able to make 3D measurement with one part in 4000 average accuracy. To see the consequence of having a wrongly guessed image center when doing calibration, we intentionally alter the apparent image center by ten pixels. The results of 3D measurement still is about as accurate. We have not yet conducted experiments with the image origin way off the apparent center of the sampled image. While doing the experiments, we did not take the center of the frame memory to be the center of the sampled image or the image origin. It is often the case that image acquisition hardware may have a slight timing error such that the starting of each line may either be too early or too late, causing the RS170 video from CCD camera to be sampled in the front or back porch (porch is the blanking interval between each line of active video). Similar situation may occur in the vertical direction, but usually to a much lesser extent. The user should observe the pixel values in the frame memory, and see if there are any blank lines on the border. For example, if there are eight blank lines on the left border and five blank lines on the top border, the image origin should be taken as the center in the frame memory offset (added) by (8, 5), which is the case we encountered in the real experiments described in Section IV.

ii) Issues concerning uncertainty scale factor $s_x$:
Unlike the multiplane case, the single plane case does not calibrate the scale factor $s_x$. In e) of Section IV-A1, it is explained in what situation one does not need to calibrate $s_x$ and how to get a priori knowledge of $s_x$. See also Step 4 in the transformation from 3D world coordinate to camera coordinate in Section II-B.

b) Compute the five unknowns $T_y^{-1}r_1$, $T_y^{-1}r_2$, $T_y^{-1}T_x$, $T_y^{-1}r_4$, $T_y^{-1}r_5$.

Procedure: For each point $i$ with $(x_{wi}, y_{wi}, z_{wi})$, $(X_{di}, Y_{di})$ as the 3D object coordinate and the corresponding image coordinate (computed in a) above), set up the following linear equation with $T_y^{-1}r_1$, $T_y^{-1}r_2$, $T_y^{-1}T_x$, $T_y^{-1}r_4$, and $T_y^{-1}r_5$ as unknowns:

$$[Y_{di}x_{wi} \; Y_{di}y_{wi} \; Y_{di} \; -X_{di}x_{wi} \; -X_{di}y_{wi}] \begin{bmatrix} T_y^{-1}r_1 \\ T_y^{-1}r_2 \\ T_y^{-1}T_x \\ T_y^{-1}r_4 \\ T_y^{-1}r_5 \end{bmatrix} = X_{di}. \quad (10)$$

With $N$ (the number of object points) much larger than five, an overdetermined system of linear equations can be established and solved for the five unknowns $T_y^{-1}r_1$, $T_y^{-1}r_2$, $T_y^{-1}T_x$, $T_y^{-1}r_4$, and $T_y^{-1}r_5$.

*Derivation and uniqueness of solutions:* Equation (10) follows simply from the radial alignment constraint $\overline{O_iP_d}$ //$\overline{P_{oz}P}$ depicted in Fig. 3 and mentioned in Section II-E. The detailed derivation is given in Appendix I. Obviously, the matrix linear equation in (10) has a unique solution if and only if the coefficient matrix has full column rank, or equivalently, all columns are linearly independent. Appendix II gives a detailed proof that the coefficient matrix has full column rank for $N$ much larger than five.

c) Compute $(r_1, \cdots, r_9, T_x, T_y)$ from $(T_y^{-1}r_1, T_y^{-1}r_2, T_y^{-1}T_x, T_y^{-1}r_4, T_y^{-1}r_5)$:

1) Compute $|T_y|$ from $T_y^{-1}r_1, T_y^{-1}r_2, T_y^{-1}T_x, T_y^{-1}r_4, T_y^{-1}r_5$:

*Procedure:* Let $C$ be a 2 × 2 submatrix of the rotation matrix $R$; i.e., $C$ is defined as $$C \equiv \begin{bmatrix} r_1' & r_2' \\ r_4' & r_5' \end{bmatrix} \equiv \begin{bmatrix} r_1/T_y & r_2/T_y \\ r_4/T_y & r_5/T_y \end{bmatrix}. \quad (11)$$

IF (not a whole row or column of $C$ vanishes), THEN compute $T_y^2$ with $$T_y^2 = \frac{S_r - [S_r^2 - 4(r_1'r_5' - r_4'r_2')^2]^{1/2}}{2(r_1'r_5' - r_4'r_2')^2} \quad (12)$$

where $S_r = r_1'^2 + r_2'^2 + r_4'^2 + r_5'^2$; ELSE (this rarely happens, if ever), compute $T_y^2$ with $$T_y^2 = (r_i'^2 + r_j'^2)^{-1} \quad (13)$$

where $r_i'$, $r_j'$ are the elements in the row or column of $C$ that do not vanish.

*Derivation and uniqueness of solution:* The derivation of the computation procedure actually follows the proof of uniqueness. Notice that the elements in (11) for $C$ are computed in b) and are unique. Furthermore, $C$ in (11) is actually the upper left 2 × 2 submatrix of the orthonormal matrix (of the first kind) $R$ scaled by $1/T_y$. The following lemma puts a restriction on how one can scale the 2 × 2 submatrix of a 3 × 3 orthonormal matrix while still maintaining orthogonality.

*Lemma I:* There do not exist two 3 × 3 orthonormal matrices that differ in their 2 × 2 submatrix by a scale factor other than ±1. Equivalently, if the 2 × 2 submatrix of an orthonormal matrix is given except for the scale factor, then that scale factor is unique except for the sign.

The proof for Lemma I is given in Appendix III. Note that $C$ (the 2 × 2 submatrix of $R$) is fixed in b) and had there been two or more solutions for $|T_y|$, then from (11), there would be two or more scale factors $r_1, r_2, r_4, r_5$, which contradicts Lemma I. Therefore, Lemma I clearly establishes the uniqueness of $|T_y|$. Equation (13) is rarely used, if ever, as discussed in Appendix IV. The formula (12) is derived in Appendix IV. Actually, as described in Appendix IV, the procedure for deriving (12) yields two expressions for $|T_y|$. From Lemma 1 only one is valid. As for why (12) is chosen, a theoretical analysis is given in Appendix IV.

2) *Determine the sign of $T_y$:*

*Procedure:* i) Pick an object point $i$ whose computer image coordinate $(X_{fi}, Y_{fi})$ is away from the image center $(C_x, C_y)$; the object world coordinate is $(x_{wi}, y_{wi}, z_{wi})$.

ii) Pick the sign of $T_y$ to be +1.

iii) Compute the following:

$$r_1 = (T_y^{-1}r_1) \cdot T_y, \quad r_2 = (T_y^{-1}r_2) \cdot T_y$$

$$r_4 = (T_y^{-1}r_4) \cdot T_y$$

$$r_5 = (T_y^{-1}r_5) \cdot T_y \quad T_x = (T_y^{-1}T_x) \cdot T_y$$

$$x = r_1 x_w + r_2 y_w + T_x \quad y = r_4 x_w + r_5 y_w + T_y$$

where $T_y^{-1}r_1$, $T_y^{-1}r_2$, $T_y^{-1}T_x$, $T_y^{-1}r_4$, and $T_y^{-1}r_5$ are determined in b).

iv) IF (($x$ and $X$ have the same sign) and ($y$ and $Y$ have the same sign)), THEN sgn $(T_y) = +1$, ELSE sgn $(T_y) = -1$.

*Derivation and uniqueness of solution:* Although $T_y^2$ or $|T_y|$ is determined uniquely in c1) above, $T_y$ can still assume + or − signs. Note that since (10) computes $T_y^{-1}r_1$, $T_y^{-1}r_2$, $T_y^{-1}T_x$, $T_y^{-1}r_4$, $T_y^{-1}r_5$, reversing the sign of $T_y$ reverses the signs of $r_1, r_2, r_4, r_5$, and $T_x$. Recall that the linear equation (10) used to solve for $T_y^{-1}r_1$, $T_y^{-1}r_2$, $T_y^{-1}T_x$, $T_y^{-1}r_4$, $T_y^{-1}r_5$ was derived from the radial alignment constraint $\overline{O_iP_d}$//$\overline{P_{oz}P}$, or $(X_d, Y_d)$//$(x, y)$, where $x = r_1 x_w + r_2 y_w + T_x$ and $y = r_4 x_w + r_5 y_w + T_y$. This sign reversal of $T_y$ causes $(x, y)$ to become $-(x, y)$, which is still parallel to $(X_d, Y_d)$, although pointing in the opposite direction. However, (4a) and (4b) say that not only is $(X_d, Y_d)$//$(X_u, Y_u)$//$(x, y)$, but also since $f$ and $z$ are both positive, $X_d$ and $x$ have the same sign, and $Y_d$ and $y$ have the same sign (this can also be seen by observing the simple geometry in Fig. 3). Therefore, only one of the two signs for $T_y$ is valid and can be determined by using the procedure described.

3) *Compute the 3D rotation matrix $R$, or $r_1, r_2, \cdots, r_9$:*

*Procedure:* i) Compute the following:

$$r_1 = (T_y^{-1}r_1) \cdot T_y, \quad r_2 = (T_y^{-1}r_2) \cdot T_y$$

$$r_4 = (T_y^{-1}r_4) \cdot T_y$$

$$r_5 = (T_y^{-1}r_5) \cdot T_y \quad T_x = (T_y^{-1}T_x) \cdot T_y$$

where $T_y^{-1}r_1$, $T_y^{-1}r_2$, $T_y^{-1}T_x$, $T_y^{-1}r_4$, $T_y^{-1}r_5$ are determined in b) above.

ii) Compute $R$ with the following formula:

$$R = \begin{bmatrix} r_1 & r_2 & (1 - r_1^2 - r_2^2)^{1/2} \\ r_4 & r_5 & s(1 - r_4^2 - r_5^2)^{1/2} \\ r_7 & r_8 & r_9 \end{bmatrix} \quad (14a)$$

where $s = -\text{sgn}(r_1 r_4 + r_2 r_5)$. sgn $(\cdot)$ signifies the sign of its argument. $r_7, r_8, r_9$ are determined from the outer product of the first two rows using the orthonormal and right-handed property of $R$.

iii) Compute the effective focal length $f$ using (15) in d), to follow. IF $(f < 0)$, THEN $$R = \begin{bmatrix} r_1 & r_2 & -(1-r_1^2-r_2^2)^{1/2} \\ r_4 & r_5 & -s(1-r_4^2-r_5^2)^{1/2} \\ -r_7 & -r_8 & r_9 \end{bmatrix}. \quad (14b)$$

*Derivation and uniqueness of solution:* Since $T_y^{-1}r_1$, $T_y^{-1}r_2$, $T_y^{-1}r_4$, $T_y^{-1}r_5$ are uniquely determined in b) and $T_y$ is uniquely determined in c-1) and -2), obviously, $r_1$, $r_2$, $r_4$, $r_5$ are uniquely determined. Note that $r_1$, $r_2$ are the elements in the upper $2 \times 2$ submatrix of rotation matrix $R$. The problem becomes how to compute the rest of the elements uniquely in $R$. This is provided by the following lemma:

*Lemma 2:* Given $2 \times 2$ submatrix of a $3 \times 3$ orthonormal matrix of the first kind,[2] there are exactly two possible solutions for the orthonormal matrix. They are given in (14a) and (14b).

*Proof:* The proof of Lemma 2 is given in Appendix V.

Now we explain why the procedure described earlier for choosing the one among (14a) and (14b) gives the correct and unique solution.

In (14a) and (14b), only the first two rows are given explicitly in terms of the given quantities $r_1$, $r_2$, $r_4$, $r_5$. From the orthonormal property of $R$ and the right-handed rule (i.e., determinant of $R$ is 1, not $-1$), $r_7$, $r_8$, and $r_9$ are easily and uniquely computed from the first two rows. Only one among (14a) and (14b) is valid. This follows from the fact that by reversing the sign of $z$ for all points in the camera 3D coordinate system, i.e., $(x, y, z) \to (x, y, -z)$, all points are still coplanar (note that this is not permissible for noncoplanar points since the mirror image of object points with respect to $z = 0$ plane reverses the right-handed rule). However, since $T_z$ is not yet computed in stage 1, one cannot compute the $z$ coordinate ($=r_7x_w + r_8y_w + r_9\cdot 0 + T_z$) yet. From (4a) and (4b), it is seen that reversing the sign of $z$ also reverses the sign of $f$. Therefore, the easiest way to select the valid one among the two solutions in (14a) and (14b) is to use the linear equation in d) below for computing approximation of $f$ and $T_z$ by ignoring distortion. The wrong one will yield negative $f$ and the right one will yield positive $f$. Note that there is no need to worry about distortion just for deciding which among the two cases would yield positive $f$, since the actual quantity of $f$ is not needed for this purpose. This is always confirmed by the experimental results, as to be seen in Section IV.

*2) Stage 2—Compute Effective Focal Length, Distortion Coefficients, and $z$ Position:*

*d) Compute an approximation of $f$ and $T_z$ by ignoring lens distortion:*

*Procedure:* For each calibration point $i$, establish the following linear equation with $f$ and $T_z$ as unknowns:

$$[y_i \quad -d_yY_i]\begin{bmatrix} f \\ T_z \end{bmatrix} = w_i d_y Y_i \quad (15)$$

[2] Orthonormal matrix of the first kind, by definition, has determinant $+1$, as opposed to orthonormal matrix of the second kind, whose determinant is $-1$.

where $$y_i = r_4 x_{wi} + r_5 y_{wi} + r_6 \cdot 0 + T_y$$

$$w_i = r_7 x_{wi} + r_8 y_{wi} + r_9 \cdot 0.$$

With several object calibration points, this yields an overdetermined system of linear equations that can be solved for the unknowns $f$ and $T_z$. The calibration plane must not be exactly parallel to image plane, otherwise (15) becomes linearly dependent.

*Derivation:* Equation (15) is derived by setting $\kappa_1$ to zero in (8b). Since $R$, $T_x$, and $T_y$ have all been determined at this point, $y$ and $w$ are fixed. Thus (15) is a linear equation with $f$ and $T_z$ as unknowns. Note that although (8a) can give rise to a similar equation, it is redundant. To solve for an approximation of $f$ and $T_z$, using (15), an overdetermined system of linear equation using a number of points can be established, and a least square solution is easily obtained. The proof for uniqueness of $f$ and $T_z$ can be found in Tsai [29].

*e) Compute the exact solution for $f$, $T_z$, $\kappa_1$:*

*Procedure:* Solve (8b) with $f$, $T_z$, $\kappa_1$ as unknowns using standard optimization scheme such as steepest descent. Use the approximation for $f$ and $T_z$ computed in d) as initial guess, and zero as the initial guess for $\kappa_1$.

*Derivation and uniqueness of solution:* With $R$, $T_x$, and $T_y$ have all been determined previously, (8b) becomes a nonlinear equation with $f$, $T_z$, $\kappa_1$ as unknowns. Usually only one or two iterations are needed.

*G. Calibrating a Camera Using Monoview Noncoplanar Points*

When $s_x$, the uncertainty scale factor in $X$, is not known *a priori*, the calibration techniques using a noncoplanar set of calibration points should be used. The same pattern used in coplanar case can be used, except that it is moved to several different heights by a $z$ stage. One can of course use a calibration pattern that is noncoplanar physically, but it is much easier to fabricate a coplanar set of calibration points than noncoplanar points whose image coordinates must be known accurately. Since $z_w$ is no longer identically zero, the linear matrix equation derived from the RAC yield solutions for seven unknowns instead of five, making both the computation and proof of uniqueness in stage 1 less tricky than the coplanar case. Just like the monoview coplanar case, the origin for the object world coordinate system should be set up away from the origin and the $y$ axis of the camera coordinate system.

*1) Stage 1—Compute 3D Orientation, Position (x and y) and Scale Factor:*

*a) Compute image coordinate $(X_d', Y_d')$, where $(X_d', Y_d')$ is defined the same as the $(X_d, Y_d)$ in (6a) and (6b) except that $s_x$ is set to 1 (that is, the uncertainty scale factor is taken to be a perfect 1):*

*Procedure:* The procedure is the same as a) for stage 1 in Section II-F except that $s_x$ is taken to be one. $s_x$ is absorbed into the unknowns for the linear equations in b) below and will be computed explicitly in c-3).

*b) Compute* $T_y^{-1}s_xr_1$, $T_y^{-1}s_xr_2$, $T_y^{-1}s_xr_3$, $T_y^{-1}s_xT_x$, $T_y^{-1} r_4, T_y^{-1} r_5, T_y^{-1} r_6$:

*Procedure:* For each calibration point $i$ with $(x_{wi}, y_{wi}, z_{wi})$ as the 3D world coordinate and $(X'_{di}, Y'_{di})$ as the modified image coordinate computed in a) above, set up the following linear equation with $T_y^{-1} s_x r_1, T_y^{-1} s_x r_2, T_y^{-1} s_x r_3, T_y^{-1} s_x T_x, T_y^{-1} r_4, T_y^{-1} r_5,$ and $T_y^{-1} r_6$ as unknowns:

$$[Y'_{di} x_{wi} \ Y'_{di} y_{wi} \ Y'_{di} z_{wi} \ Y'_{di} \ -X'_{di} x_{wi} \ -X'_{di} y_{wi} \ -X'_{di} z_{wi}]$$

$$\cdot \begin{bmatrix} T_y^{-1} s_x r_1 \\ T_y^{-1} s_x r_2 \\ T_y^{-1} s_x r_3 \\ T_y^{-1} s_x T_x \\ T_y^{-1} r_4 \\ T_y^{-1} r_5 \\ T_y^{-1} r_6 \end{bmatrix} = X'_{di}. \quad (16)$$

With $N$ (the number of object points) much larger than seven, an overdetermined system of linear equations can be established and solved for the seven unknowns $T_y^{-1} s_x r_1, T_y^{-1} s_x r_2, T_y^{-1} s_x r_3, T_y^{-1} s_x T_x, T_y^{-1} r_4, T_y^{-1} r_5,$ and $T_y^{-1} r_6$.

*Derivation and uniqueness of solutions:* Equation (16) is derived by following exactly the same procedure as coplanar case in using the radial alignment constraint but with $z_w$ not set to zero (see Appendix I for detail). Obviously, the matrix linear equation in (16) has a unique solution if and only if the coefficient matrix has full column rank, or equivalently, all columns are linearly independent. Appendix II contains a detailed proof that the coefficient matrix has full column rank for $N$ much larger than seven.

*c) Compute* $(r_1, \cdots, r_9, T_x, T_y)$ *from* $T_y^{-1} s_x r_1, T_y^{-1} s_x r_2, T_y^{-1} s_x r_3, T_y^{-1} s_x T_x, T_y^{-1} r_4, T_y^{-1} r_5, T_y^{-1} r_6$: The derivation and proof of uniqueness of solution are straightforward, and can be found in Tsai [29].

1) *Compute* $|T_y|$ *from* $T_y^{-1} s_x r_1, T_y^{-1} s_x r_2, T_y^{-1} s_x r_3, T_y^{-1} s_x T_x, T_y^{-1} r_4, T_y^{-1} r_5, T_y^{-1} r_6$:

*Procedure:* Let $a_i, i = 1, \cdots, 7$ be defined as $a_1 = T_y^{-1} s_x r_1, a_2 = T_y^{-1} s_x r_2, a_3 = T_y^{-1} s_x r_3, a_4 = T_y^{-1} s_x T_x, a_5 = T_y^{-1} r_4, a_6 = T_y^{-1} r_5, a_7 = T_y^{-1} r_6$. Note that all the $a_i$ from $i = 1, \cdots, 7$ are determined in b). Compute $|T_y|$ using the following formula:

$$|T_y| = (a_5^2 + a_6^2 + a_7^2)^{-1/2}. \quad (17)$$

2) *Determine the sign of* $T_y$: The procedure, derivation, and uniqueness argument are the same as those for the coplanar case.

3) *Determine* $s_x$:

*Procedure:* Use the following formula to compute $s_x$:

$$s_x = (a_1^2 + a_2^2 + a_3^2)^{1/2} |T_y|. \quad (18)$$

4) *Compute the 3D rotation matrix R, or* $r_1, r_2, \cdots, r_9$:

*Procedure:* Compute $r_1, r_2, r_3, r_4, r_5, r_6,$ and $T_x$ with the following formula:

$$r_1 = a_1 \cdot T_y/s_x \quad r_2 = a_2 \cdot T_y/s_x \quad r_3 = a_3 \cdot T_y/s_x$$

$$r_4 = a_5 \cdot T_y \quad r_5 = a_6 \cdot T_y \quad r_6 = a_7 \cdot T_y$$

$$T_x = a_4 \cdot T_y$$

where $a_i, i = 1, \cdots, 7$ are defined in (1) and are the seven variables computed in b).

Given $r_i, i = 1, \cdots, 6$, which are the elements in the first two rows of $R$, the third row of $R$ can be computed as the cross product of the first two rows, using the orthonormal property of $R$ and the right-handed rule (determinant of $R = 1$, not $-1$).

*Derivation and uniqueness:* The derivation simply follows from the definition of $a_i$ in b). The uniqueness follows from the fact that the formula is explicit and that given two rows of a $3 \times 3$ orthonormal matrix with determinant $+1$, the third row is always unique.

2) *Stage 2—Compute Effective Focal Length, Distortion Coefficients, and z Position:* a) Compute of an approximation of $f$ and $T_z$ by ignoring lens distortion: The procedure, derivation, and uniqueness are exactly the same as that for the coplanar case.

b) Compute the exact solution for $f, T_z, \kappa_1$: This again is the same as the coplanar case.

H. Multiple Viewing Position Calibration

When more than one view is taken at different position and orientation relative to the calibration points with a single camera, the extrinsic parameters of the camera differs from view to view, but the intrinsic parameters remain the same. We can exploit this when using multiple views by choosing the set of intrinsic parameters that optimizes the global consistency between camera model and observations. The disadvantage that quickly comes to mind is the increase of dimensionality in parameter space, making the computation less suitable for automated robotics application. However, because the new two stage technique computes most of the extrinsic parameters in stage 1, the disadvantage of increase in dimensionality for parameter space no longer prevails. Due to the limit of space, the technique using multiple view is not described here. See Tsai [29] for detail.

III. ACCURACY ASSESSMENT

It is difficult to obtain high accuracy ground truth for camera calibration parameters that can serve as absolute reference. Therefore, we will assess the accuracy of the two-stage camera calibration by how well it can sense or measure the 3D world.

A. Three Types of Measures for Camera Calibration Accuracy

We will adopt the following three types of measures.

*Type I—Accuracy of 3D Coordinate Measurement Obtained through Stereo Triangulation Using the Calibrated Camera Parameters:* The procedure is as follows.

1) Calibrate one camera using either coplanar or noncoplanar points, monoview or multiview. If monoview calibration is used, repeat the calibration procedure for another camera rigidly connected with camera 1 (the purpose of the second camera is to provide stereo triangulation capability to be used later).

2) Acquire 2D image coordinates for a set of test points whose 3D coordinates are known relative to the same 3D world coordinate system used for the calibration points, using the camera (or cameras) in the same viewing position as for the calibration.

3) Compute the 3D coordinates of the above test points in the world coordinate system using stereo triangulation. If multiview calibration was used, two views are sufficient for stereo triangulation. If monoview calibration was used, then since two cameras rigidly connected together in (1) were calibrated, stereo triangulation can still be done.

4) The accuracy of camera calibration is assessed by comparing the difference between the known 3D coordinates of the test points and the coordinates computed in (3). That comparison can be done either in the 3D world coordinate system, or in the computed 3D camera coordinate system. We will use the latter throughout this section because in 3D camera coordinate system, physical meaning can be easily attached to the $x$, $y$, $z$ coordinates. For example, $z$ coordinate is the depth, and $x$ and $y$ coordinate axes are parallel to $X$, $Y$ coordinate axes in the image plane.

*Type II—Radius of Ambiguity Zone in Ray Tracing:*
As shown in Fig. 1, the calibration process tries to find camera model parameters such that the ray starting from the optical center $O$, passing through the true image point $P_d$ (the ray bends at $P_d$ according to the extent of radial distortion), will eventually pass through the calibration object point $P$. Of course, due to error, the ray will not exactly pass through $P$. After the camera model is calibrated or reconstructed, this path of ray in Fig. 1 can be back traced, that is, starting from the optical center, the ray can be traced through the image point and "back projected" into the object world passing through the object point $P$. One way of measuring the camera calibration accuracy is the extent of ambiguity of error of this ray tracing in one view, which is the basis of Type II measure. As seen in Fig. 5, error of camera model reconstruction causes the ray to miss the point $P$. Using Type II measure in assessing camera calibration accuracy is to see how much the ray misses the object point $P$. To see the relationship between Type II and I measures, consider the fact that if the ray tracing can be done very accurately, then obviously with two views, the intersection of the two rays gives the 3D coordinate of the object point $P$. Therefore, the accuracy of reconstructing the 3D coordinate of $P$ is a measure of the accuracy of camera calibration, which is the basis for the Type I measure just described. The procedure is as follows.

1) Calibrate the camera using a coplanar set of points on a plane (called plane $V$ in Fig. 5).

2) Set up a coplanar set of test points whose 3D coordinates in the object world coordinate system (in which the coordinate of the calibration points are defined) are known, and the position of the plane (called plane $U$ in Fig. 5) on which the test points reside is also known. Take one view.

3) For each image point $P_d$ on the test plane $U$, use the calibrated camera model in (1) to back project the ray from $O$ through $P_d$ and intersect with plane $U$ at $P'$. The distance

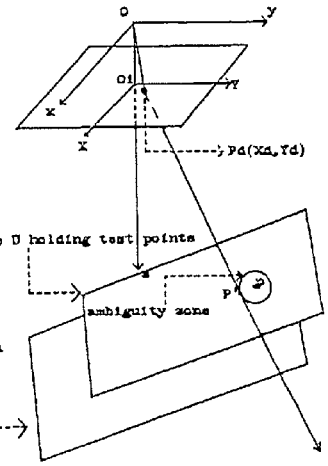

Fig. 5. Radius of ambiguity zone is Type II measure for camera calibration accuracy. $P$ is ideal object point, and $P'$ is point where back projected ray using calibrated camera model intersects with object surface plane $U$.

between $P'$ and $P$ (the ideal point in plane $U$) is called the *radius of the ambiguity zone* (as depicted in Fig. 5).

*Type III—Accuracy of 3D Measurement:* Since a calibrated camera may be applied to measure relative 3D information instead of absolute 3D coordinate, e.g., dimensional inspection of mechanical parts, it is useful to measure the goodness of camera calibration by how well the camera can be used to perform dimensional measurement.

B. Accuracy Analysis Summary

As explained earlier in this section, we assess the accuracy of camera calibration by measuring how accurately the camera measures the 3D world. The remainder of this section reviews the formula of accuracy or error for camera calibration/3D measurement provided in Tsai [26] which will later be used for the analysis of experimental results. It is important to note that the purpose of this section is not to propose a new accuracy results or to prove its validity. The accuracy analysis formula is only to double check the numerical figures of the experimental results.

C. Theoretical Upper Bound of Error for 3D Measurement

It is shown in Tsai [26] that the error of 3D measurement of the $x$, $y$, $z$ coordinate of a feature point using stereo triangulation is bounded above by $$\text{error}_{\text{total}} \leq \left[\left(1 + \frac{1}{\sqrt{6N_0 N_f}}\right)\frac{z}{f} + \frac{\|T_x\|}{L\sqrt{6N_0}}\left(1 + \frac{1}{N_f}\right)\right. $$
$$\left. + \frac{1}{2\sqrt{6N_0}} + \frac{1}{2\sqrt{6N_0}}\frac{z}{f}\right]\frac{z}{\|T_x\|} \cdot b + \Delta q \quad (22)$$

where $b$      effective image spatial quantization or the error of $N_0$ total number of points used in calibration,
$\|T_s\|$ distance between the optical centers of the two camera viewing stations,[3]
$N_f$ number of views used in calibration (i.e., one for monoview calibration, two for multiple viewing position calibration using two views, etc.),
$L$ dimension of the image sensor chip, or more generally the size of the active area in image plane scanned by the camera,
$\Delta q$ target ambiguity in three-space (e.g., if the corner of a rectangular block is the target point, then the edge break or the sharpness of edges determines the extent of ambiguity for the true location of the target point).

Here it is assumed that for single-plane calibration, the calibration plate is sufficiently tilted with respect to the image plane (at least 30°). For the experiments described below, all the image coordinates are extracted with special interpolation algorithm that aims at subpixel accuracy. Therefore, $\delta$ in the above error formula is about one-half or one-third of $d_x$ and $d_y$ in (6e) and (6f). In Section IV-A1, d) contains more details on how the special interpolation technique is implemented during experiments.

Equation (22) serves as the theoretical upper bound for the error in Types I and II measures described in Section III-A. The upper bound for the error of making dimensional measurement is twice as much as that for a single feature point. In all of the tests to be described in Section IV the experimentally obtained accuracy measures of the camera calibration will be compared against the accuracy predicted by the theoretical formula in (22).

*1) Effect of Number of Points on Calibration Accuracy:* By observing the expression for $\text{error}_{total}$ in (22), one can see that there are two groups of terms, one scaled by $1/\sqrt{N_0}$, $1/\sqrt{N_f}$, or $1/N_f$, while the other not influenced by $N_0$ or $N_f$ at all. We shall call the former $\text{error}_{calib}$ and the latter $\text{error}_{noncalib}$. They are given in the following:

$$\text{error}_{calib} = \left[\frac{1}{\sqrt{6N_0N_f}}\frac{z}{f} + \frac{\|T_s\|}{L\sqrt{6N_0}}\left(1+\frac{1}{N_f}\right) + \frac{1}{2\sqrt{6N_0}}\right.$$
$$\left. + \frac{1}{2\sqrt{6N_0}}\frac{z}{f}\right]\frac{z}{\|T_s\|}\cdot\delta \quad (23)$$

$$\text{error}_{noncalib} = \frac{z}{f}\frac{z}{\|T_s\|}\delta + \Delta q. \quad (24)$$

By observing (23) and (24), one can see that $\text{error}_{noncalib}$ remains the same for either coplanar, noncoplanar, or multiple viewing calibration, while $\text{error}_{calib}$ varies depending on $N_0$ and $N_f$. If, for instance, $N_0$ is large enough for coplanar calibration, the accuracy should not be worse than that for the noncoplanar or multiple viewing calibration. Again, the calibration plate has to be sufficiently tilted for single-plane calibration. In this case, $\text{error}_{calib} \ll \text{error}_{noncalib}$, and that $\text{error}_{total} \approx \text{error}_{noncalib}$. A good indication of whether the number of points is large enough is that the ratio $\text{error}_{calib}/\text{error}_{noncalib}$ predicted using (23) and (24) is small. In all of the tests to be presented in the next section, the number of calibration points $N_0$ is at least 60. That is the reason why the accuracy for all cases are good and that the single-plane calibration performs just as well as multiple planes or multiple viewing position calibration. If fewer points are used, the error can be predicted by (22), and the actual experimentation for testing the effect of the number of points is part of list of our future activity.

IV. TEST RESULTS

In this section, we will describe the procedure and analyze the results of two different tests of the two-stage camera calibration technique: 1) monoview single-plane calibration, type of measure for calibration accuracy is Type II; 2) monoview multiplane multicamera measurement, type of measure for calibration accuracy is Type I and III.

A. Test Results for Monoview Single-Plane Calibration

*1) Experimental Procedure:* The procedure for Type II measure described in Section III-A is followed step by step to compute the Type II measure. The first step, which is to calibrate the camera, is described in greater detail here.

*a) Description of the mechanical hardware of calibration and test points and the procedure for constructing it:* The calibration and test points were created by impressing a template of Letraset instant lettering graphics sheet containing 16 black squares on the top surface of a steel block 2 in × 1.5 in × 0.5 in in size (see Fig. 6). The corners of the 16 squares are treated as calibration points, making a total of 64 points. Only 60 points were chosen for the experiment due to defects or blemishes in the squares (see Fig. 8, the square on the top left corner is defected, leaving two points out) and the omissions in the process of obtaining 3D coordinates of the corner points needed for calibration leaving another two points out, as indicated by the missing white dots on the two corners of the twelfth block counting from left to right, top to bottom, in Fig. 10).

*b) The process of obtaining 3D world coordinates of the calibration and test points:* The 3D coordinates of the corners of the squares, which will be used as input to the calibration process, were obtained by using an $XY$ micrometer stage (0.1 mil resolution) and a Nikon 400× microscope.[4] Because the corners for the instant lettering graphics template are always rounded, it is necessary to measure the coordinate of a number of points along the edges of the square away from the corners, and then extrapolate the edges to obtain the ground truth for the corners which lie on the intersection of the adjacent edges.

*c) How accurate should the 3D coordinates of the calibration points be?* To obtain calibration patterns that are

---

[3] If only one camera station is involved, e.g., the setup for Type II measure described in Section III-A, then $\|T_s\|$ is to be taken as the average depth of calibration points from the lens center.

[4] The process can be automated by using a motor driven $XY$ translation stage and a TV camera hooked up to the microscope (such facility is very common in the market). Since the same calibration pattern can be used again and again, and the calibration process need not be done frequently to the same camera, it is not important to worry about automating the process for collecting 3D coordinates of calibration points.

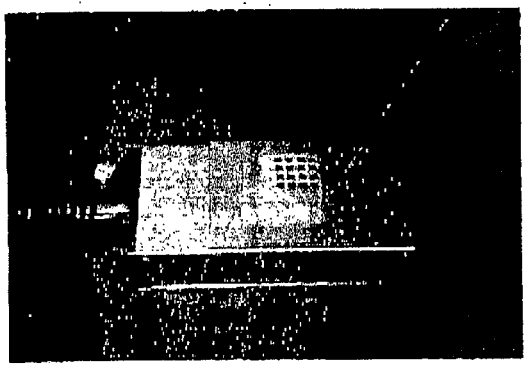

Fig. 6. Steel block on top of which Letraset instant lettering graphics are impressed. Corners of black squares are calibration points.

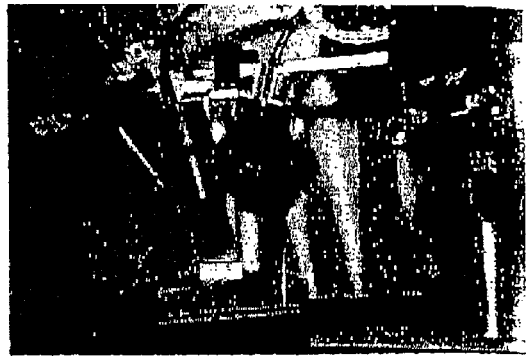

Fig. 7. Setup for camera calibration for all tests. Only one of two cameras is used for first two tests.

highly accurate and easily processed by the computer is not easy. Therefore, one should consider how accurate the calibration points must be to achieve a certain accuracy for calibration/3D measurement. Note that $error_{calibration}$ in (23) is scaled by $\sqrt{6}N_0^{-1}$. Therefore, for a large number of points, $error_{calibration}$ becomes negligible compared with $error_{noncalibration}$. However, (23) assumes that the error of calibration points is either comparable to image spatial quantization error and random, or is much less than image spatial quantization error irrespective of randomness. Therefore, if there is any factor during the process of creating and measuring the 3D coordinates of the calibration points that would cause the error of calibration coordinates to be nonrandom or systematic, that factor must be reduced to a minimum such that the nonrandom error is less than the desired final accuracy of 3D measurement. If the desired measurement accuracy is of the order of 1 mil, then the factors such as flatness of the surface holding the calibration pattern and the parallelism between the top and bottom of the surfaces are the only factors that need to be controlled. All other factors tend to give random error and can easily be made smaller than image spatial quantization. It is important to keep the tolerance for the flatness and parallelism at least one order of magnitude tighter than the final goal of 3D measurement using the calibrated camera; for example, if the final accuracy is desired to be 1 mil, then the surface flatness and parallelism has to be 0.1 mil accurate.

*d) Extraction of computer image coordinates for the calibration and test points:* Images of calibration and test objects were acquired with a Fairchild CCD 3000 camera and a Fuji 25-mm focal length TV lens, using the setup shown in Fig. 7. The objects were illuminated using a fiber-optic illuminator (any intense diffuse source would also work).

Computer image coordinates for calibration and test points (corners of black Letraset squares) were extracted as follows.

1) Acquire a gray scale image (see Fig. 8).
2) Threshold the image to produce a binary image (see Fig. 9); the exact threshold value is not critical and could be set by analysis of intensity histograms or some ad hoc method (in the current work, the threshold was selected manually).

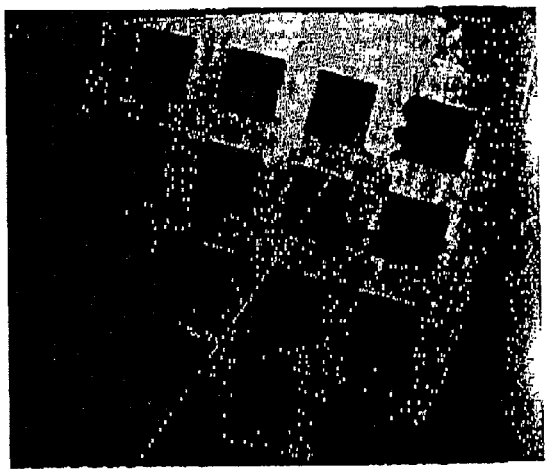

Fig. 8. Gray scale image of calibration pattern viewed by computer. One square is defective.

Fig. 9. Thresholded binary image of calibration pattern viewed by computer.

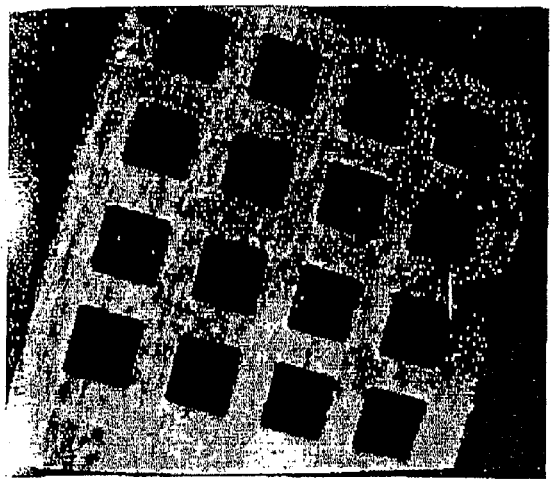

Fig. 10. White dots at corners of black squares are calibration points extracted by computer using special interpolation technique, which reduces effect of image spatial quantization of factor of 2 or 3.

d) Link edge points in the binary image to extract a set of approximate boundary edges.

e) Scan in the direction perpendicular to the approximate edge locations in the gray scale image to locate the "true" edge points using interpolation.

f) Fit straight lines to true edge points. Then compute intersections, yielding feature point (corner) coordinates. Fig. 10 illustrates the result by superimposing white dots on the original gray scale image at computed feature locations. This procedure yielded image coordinates with an accuracy of 1/2 to 1/3 pixel; in the CCD 3000 camera, pixels are spaced approximately 1 mil apart (center to center, in $X$ and $Y$ directions).

e) *Compute camera intrinsic and extrinsic parameters using the two-stage technique:* With the image coordinates extracted in d) and the 3D world coordinates of the calibration points obtained in b), the key equations (10), (15), and (8b) used for camera calibration can be used if $s_x$ is given. *A priori* knowledge of $s_x$ is needed only for single plane case. Since our experience shows that $s_x$ is quite consistent for CCD 3000 camera, the same $s_x$ can be used for any Fairchild 3000 camera. Furthermore, in many cases, when one changes the lens and/or exterior orientation/position of the camera, the calibration must be done again, but $s_x$ is already calibrated before. We simply take the value of $s_x$ that we normally find for Fairchild CCD 3000, which is 1.042, in this experiment. It is found that with Fuji 25-mm lens, the angle is wide enough so that the radial distortion is significant. The distortion is found to be barrel type negative distortion, as expected. The undistorted image coordinate $(X_u, Y_u)$ computed from computer image coordinate $(X, Y)$ and the calibrated distortion coefficients $\kappa_1, \kappa_2$ are displayed in Fig. 11, together with the original distorted points. For the points far away from the center, the distortion is about three to four pixels.

2) *Experimental Results for Monoview Single-Plane Calibration:* A total of 60 calibration points and 60 test points were used, and Type II measure described in Section III-A is computed and tabulated below. Type II measure:

| | |
|---|---|
| Average radius of ambiguity zone | 0.7 mil |
| Maximum radius of ambiguity zone | 1.3 mil |

*Note:* 1 mil = 0.001 in.

The computer time for calibration is 1.5 s. This computer time refers to the time taken for performing steps 1 and 2 of the calibration procedure. It can be reduced to half a second when seven calibration points are used. The program is not optimized for speed performance. It can further be reduced if effort is invested to optimize the program. The computer used is a 68 000 based MASSCOMP minicomputer. We have very recently improved the speed such that it only takes 20 ms to do extrinsic calibration and less than 1 s to do the whole calibration when 36 points are used. It is expected to improve even more. In fact with slight modification, the entire two-stage calibration can be done in less than 30 ms.

In the above test, the image origin is chosen to be the apparent center of the sampled image (see the discussion and derivation of a) in Stage 1 of Section I-F. Experiments were also conducted using an arbitrarily chosen image origin (10 × 10 off the origin used in the above test); the results show no significant difference (see discussion and derivation of a) in Stage 1 of Section I-F.

3) *Analysis:* a) *Comparison between experimentally obtained error and predicted error:* To use (22)–(24) to obtain a theoretical upper bound on error, the following parameters are necessary:

$L = 0.4$ in $\quad f = 1.1$ in $\quad z \approx 4$ in $\quad T_z = 3$ in $\Delta q = 0.1$ mil $\quad N_f = 1$ $\quad d_x \approx d_y = 1$ mil $N_0$ (number of points) = 60.

Since super resolution interpolation scheme was used when extracting image coordinates, the effective image spatial quantization $\delta$ is about 1/2 or 1/3 of $d_x$ or $d_y$, the distance between adjacent CCD sensor elements. Using (22)–(24), the following table for the theoretical upper bound of three types of error described in Section III-B is obtained.

| | | |
|---|---|---|
| Effective image quantization | $\delta = 1/2$ mil | $\delta = 1/3$ mil |
| Error$_{total}$ (predicted) | 3.3 mil | 2.3 mil |

It is clearly seen by comparing the order of magnitude between the theoretical error bound and the actual error, the error bound is tight enough.

b) *Predicted effect of number of calibration points:* In Section III-C1 it is explained why the ratio error$_{calib}$/error$_{noncalib}$ gives a good indication or theoretical prediction of whether the number of points is large enough. From (23) and (24), the following table is obtained:

| Effective Image Quantization | $\delta = 1/2$ mil | $\delta = 1/3$ mil |
|---|---|---|
| Error$_{calib}$ | 0.7 mil | 0.5 mil |
| Error$_{noncalib}$ | 2.5 mil | 1.7 mil |
| Error$_{calib}$/error$_{noncalib}$ | 29 percent | 28 percent |

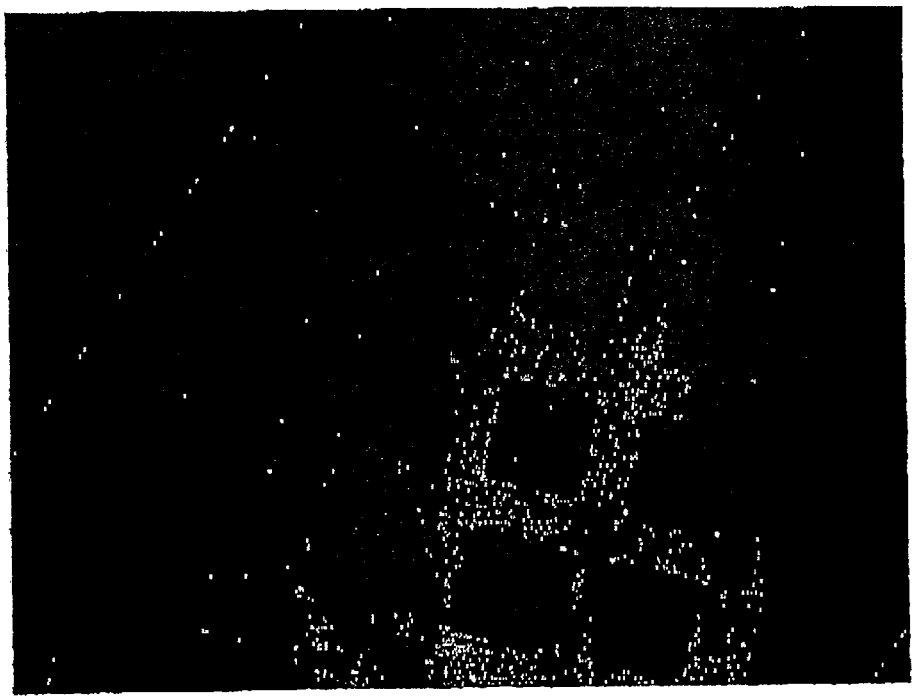
Fig. 11. White dots near corners of black square are original calibration points and corrected or undistorted points. Size of frame buffer holding image is 480 × 512. Therefore, it is seen that distortion near border is roughly three to four percent.

coordinate of one corner from another. That is why the actual error for Type III is very similar to that of Type I. Since systematic error may not cancel out in all cases, it is better to regard the theoretical upper bound for Type III measure as twice as much as that for Type I or II.

V. CONCLUSION

The new two-stage technique is theoretically and experimentally proven to be viable for 3D machine vision metrology. It is shown to be efficient, accurate, and straightforward to implement in real environment. A new theoretical framework is established, supported by comprehensive proof in the appendixes, and may pave the way for future research in 3D robotics vision. The issues involving the image origin are not fully exploited, although limited experimental results indicate that it has negligible effect on the accuracy of final 3D measurement. The effect of the number of calibration points is not fully investigated. Experimental results show that 60 points or more are more than sufficient. Future work may be needed in investigating the effect of the number of points on the accuracy on the three cases (monoview single plane, monoview multiplane, multiview). Finally, although experiments on real data are reported in this paper, the potential of any new technique will not be fully revealed unless extensive applications are implemented using the new technique. Readers are encouraged to apply the new technique to a wide variety of machine vision applications to exploit its full potential. Recent effort indicates that with slight modification, the entire two-stage calibration can be done in speed faster than the video frame rate.

APPENDIX I

PROOF OF RADIAL ALIGNMENT CONSTRAINT AND DERIVATION OF (10) AND (16) FROM THE CONSTRAINT

The radial alignment constraint $\overline{O_i P_d}//\overline{P_{oz} P}$ depicted in Fig. 3 follows from the very simple geometric argument that $\overline{O_i P_d}$ and $\overline{P_{oz} P}$ are the intersection of a plane (passing through $O$, $P_{oz}$, and $P$) with two parallel planes (one being the image plane, and the other being the plane parallel to image plane and passing through $P$ and $P_{oz}$). Similarly, $\overline{O_i P_u}//\overline{P_{oz} P}$. Therefore, $\overline{O_i P_d}//\overline{P_{oz} P}//\overline{O_i P_u}$. Since $\overline{O_i P_d}//\overline{P_{oz} P}$ is equivalent to $\overline{O_i P_d} \times \overline{P_{oz} P} = 0$ where $\times$ signifies vector outer product, we have $$(X_d, Y_d) \times (x, y) = 0$$

or $$X_d \cdot y - Y_d \cdot x = 0. \quad (25)$$

Note that (25) can also be derived algebraically from (4a), (4b), (5a), and (5b). To arrive at an equation like (10) that contains the image coordinate $(X_d, Y_d)$ and 3D world coordinate $(x_w, y_w, z_w)$ of the calibration point, (1), (4a), and (4b) are used to convert (25) to the following:

$$X_d(r_4 x_w + r_5 y_w + r_6 z_w + T_y) = Y_d(r_1 x_w + r_2 y_w + r_3 z_w + T_x). \quad (26)$$

By rearranging the terms in (26) such that $T_y^{-1} s_x r_1$, $T_y^{-1} s_x r_2$, $T_y^{-1} s_x r_3$, $T_y^{-1} s_x T_x$, $T_y^{-1} r_4$, $T_y^{-1} r_5$, $T_y^{-1} r_6$ are treated as unknown variables, (16) is obtained.

The subscript $i$ for all $X_i$, $Y_i$, $x_{wi}$, $y_{wi}$, $z_{wi}$ in (16) simply puts an index to $(X, Y)$ and $(x_w, y_w, z_w)$ for identification purpose. For the coplanar case, by setting $z_w$ in (26) to 0, and by treating $T_y^{-1} s_x r_1$, $T_y^{-1} s_x r_2$, $T_y^{-1} s_x r_3$, $T_y^{-1} s_x T_x$, $T_y^{-1} r_4$, $T_y^{-1} r_5$, $T_y^{-1} r_6$ as unknown variables, (10) is obtained.

APPENDIX II

PROOF FOR THE LINEAR INDEPENDENCE OF COLUMNS OF COEFFICIENT MATRIX IN (10) AND (16)

*Proof for the Linear Independence of Columns of Coefficient Matrix in (16)*

Let $N$ be the total number of calibration points, and $G$ be the coefficient matrix in (16). Then $$G = \begin{bmatrix} Y'_{d1} x_{w1} & Y'_{d1} y_{w1} & Y'_{d1} z_{w1} & Y'_{d1} & -X'_{d1} x_{w1} & -X'_{d1} y_{w1} & -X'_{d1} z_{w1} \\ Y'_{d2} x_{w2} & Y'_{d2} y_{w2} & Y'_{d2} z_{w2} & Y'_{d2} & -X'_{d2} x_{w2} & -X'_{d2} y_{w2} & -X'_{d2} z_{w2} \\ \cdot & \cdot & \cdot & \cdot & \cdot & \cdot & \cdot \\ \cdot & \cdot & \cdot & \cdot & \cdot & \cdot & \cdot \\ Y'_{dN} x_{wN} & Y'_{dN} y_{wN} & Y'_{dN} z_{wN} & Y'_{dN} & -X'_{dN} x_{wN} & -X'_{dN} y_{wN} & -X'_{dN} z_{wN} \end{bmatrix}. \quad (27)$$

By replacing $X'_{di}$ with $s_x \cdot X_d$, and replacing $(X_d, Y_d)$ with terms involving $(X_u, Y_u)$ using (5a) and (5b), followed by replacing $(X_u, Y_u)$ with terms involving $(x, y, z)$ using (4a) and (4b), it is straightforward to show that (27) is equivalent to $$G = D_1 \cdot H \cdot D_2 \quad (28)$$

where $D_1$, $D_2$ are diagonal matrices given $$D = f \cdot \text{diag} \{(K_1 z_{w1})^{-1}, (K_2 z_{w2})^{-1}, \cdots, (K_N z_{wN})^{-1}\}$$

$$K_i = 1 + \kappa_1 r_i^2 + \kappa_2 r_i^4$$

$$r_i = (X_d^2 + Y_d^2)^{1/2}$$

$$D_2 = \text{diag} \{1, 1, 1, 1, s_x, s_x, s_x\}$$

and $H$ is given by $$H = \begin{bmatrix} y_1 x_{w1} & y_1 y_{w1} & y_1 z_{w1} & y_1 & -x_1 x_{w1} & -x_1 y_{w1} & -x_1 z_{w1} \\ y_2 x_{w2} & y_2 y_{w2} & y_2 z_{w2} & y_2 & -x_2 x_{w2} & -x_2 y_{w2} & -x_2 z_{w2} \\ \cdot & \cdot & \cdot & \cdot & \cdot & \cdot & \cdot \\ \cdot & \cdot & \cdot & \cdot & \cdot & \cdot & \cdot \\ y_N x_{wN} & y_N y_{wN} & y_N z_{wN} & y_N & -x_N x_{wN} & -x_N y_{wN} & -x_N z_{wN} \end{bmatrix}. \quad (29)$$

Notice that all the diagonal elements in $D_1$ and $D_2$ are nonzero since $z_{wi}$ is always greater than the effective focal length $f$, and $K_i$ is never zero. (From (5a) and (5b), had $K_i$ been zero, a nonzero $(X_d, Y_d)$ would be mapped into a zero $(X_u, Y_u)$, which is optically impossible.) Therefore, the linear independence of the columns of $G$, which is the product of the three matrices $D_1$, $H$, and $D_2$, is not influenced by $D_1$, $D_2$. That is, it suffices to verify the linear independence of the columns of $H$.

Let $H_i$ be the $i$th column of $H$. It is to be shown that the necessary and sufficient condition for $$\sum_{i=1}^{7} a_i H_i = 0 \qquad (30)$$

is that $a_i = 0$ for $i = 1, \cdots, 7$. The sufficiency is obvious. We now show the necessity part. Substituting $(x_i, y_i, z_i)$ in (29) by expressions involving $(x_{wi}, y_{wi}, z_{wi})$ using (1), (30) becomes $$a_1(r_4 x_{wi}^2 + r_5 x_{wi} y_{wi} + r_6 x_{wi} z_{wi} + T_y x_{wi})$$
$$+ a_2(r_4 x_{wi} y_{wi} + r_5 x_{wi}^2 + r_6 y_{wi} z_{wi} + T_y y_{wi})$$
$$+ a_3(r_4 z_{wi} x_{wi} + r_5 z_{wi} y_{wi} + r_6 z_{wi}^2 + T_y z_{wi})$$
$$+ a_3(r_4 z_{wi} x_{wi} + r_5 z_{wi} y_{wi} + r_6 z_{wi}^2 + T_y z_{wi})$$
$$+ a_4(r_4 x_{wi} + r_5 y_{wi} + r_6 z_{wi} + T_y)$$
$$+ a_5(r_1 x_{wi}^2 + r_2 x_{wi} y_{wi} + r_3 x_{wi} z_{wi} + T_x x_{wi})$$
$$+ a_6(r_1 x_{wi} y_{wi} + r_2 y_{wi}^2 + r_3 y_{wi} z_{wi} + T_x y_{wi})$$
$$+ a_7(r_1 x_{wi} y_{wi} + r_2 y_{wi} z_{wi} + r_3 y_{wi} z_{wi} + T_x y_{wi})$$
$$= 0 \qquad (31)$$

for $i = 1, \cdots, N$. That is, (31) has to hold simultaneously for all $i$ from 1 to $N$. Since, for the purpose of accuracy, $N$ should be chosen to be much larger than seven, asymptotically, (31) has to be satisfied for all possible values of $(x_{wi}, y_{wi}, z_{wi})$. Therefore, (31) can be treated as a polynomial equation with $x_w^2, y_w^2, z_w^2, x_w y_w, x_w z_w, y_w z_w, x_w, y_w, z_w, 1$, as nominals. Since for a polynomial to be identically zero, all leading coefficients for the nominals must vanish, we obtain the following set of constraints on $a_i$, $i = 1, \cdots, 8$:

| | | |
|---|---|---|
| for $x_w^2$, | $a_1 r_4 + a_5 r_1 = 0$ | (32) |
| for $y_w^2$, | $a_2 r_5 + a_6 r_2 = 0$ | (33) |
| for $z_w^2$, | $a_3 r_6 + a_7 r_3$ | (34) |
| for $x_w y_w$, | $a_1 r_5 + a_2 r_4 + a_5 r_2 + a_6 r_1 = 0$ | (35) |
| for $x_w z_w$, | $a_1 r_6 + a_3 r_4 + a_5 r_3 + a_7 r_1 = 0$ | (36) |
| for $y_w z_w$, | $a_2 r_6 + a_3 r_5 + a_6 r_3 + a_7 r_2 = 0$ | (37) |
| for $x_w$, | $a_4 r_4 + a_1 T_y + a_5 T_x = 0$ | (38) |
| for $y_w$, | $a_4 r_5 + a_2 T_y + a_6 T_x = 0$ | (39) |
| for $z_w$, | $a_4 r_6 + a_3 T_y + a_6 T_x = 0$ | (40) |
| for 1, | $a_4 T_y = 0$ | (41) |

The purpose is to show that the above constraints will force all $a_i$, $i = 1, \cdots, 7$, to be identically zero.

Although theoretically more complicated, it can be proved that all $a_i$ must vanish irrespective of whether $T_x$ or $T_y$ is zero. However, since $T_x$ and $T_y$ can easily be made nonzero with proper experimental setup (see a) in Stage 1 for the calibration algorithm), and that for the purpose of simplicity and clarity, we now assume that $T_x$ and $T_y$ are nonzero.

From (41), $a_4 = 0$. Then (38)-(40) become $$a_1 = -a_5 T_x / T_y \qquad (42)$$
$$a_2 = -a_6 T_x / T_y \qquad (43)$$
$$a_3 = -a_7 T_x / T_y \qquad (44)$$

Substituting (42) into (32), (43) into (33), and (44) into (34) gives $$-a_5 r_4 T_x / T_y + a_5 r_1 = 0 \qquad (45)$$
$$-a_6 r_5 T_x / T_y + a_6 r_2 = 0 \qquad (46)$$
$$-a_7 r_6 T_x / T_y + a_7 r_3 = 0 \qquad (47)$$

Substituting (42) and (43) into (35), (32) and (34) into (36), (33) and (34) into (37) gives $$-a_5 r_5 T_x / T_y - a_6 r_4 T_x / T_y + a_4 r_2 + a_6 r_1 = 0 \qquad (48)$$
$$-a_5 r_6 T_x / T_y - a_7 r_4 T_x / T_y + a_5 r_3 + a_7 r_1 = 0 \qquad (49)$$
$$-a_6 r_6 T_x / T_y - a_7 r_5 T_x / T_y + a_6 r_3 + a_7 r_2 = 0 \qquad (50)$$

If none of $a_4$, $a_5$, $a_6$ is zero, then from (45)-(47)

$$\begin{bmatrix} r_4 \\ r_5 \\ r_6 \end{bmatrix} = \frac{T_y}{T_x} \begin{bmatrix} r_1 \\ r_2 \\ r_3 \end{bmatrix} \qquad (51)$$

which is impossible since $R$ is orthonormal, and $[r_4 r_5 r_6]$ must not be equal to $[r_1 r_2 r_3]$ scaled by a constant. Therefore, at least one of $a_5$, $a_6$, $a_7$ must be zero. Due to symmetry, it suffices to take $a_5$ as zero (the same proof applies if $a_6$ or $a_7$ is taken to be zero first). Then from (42), $a_1 = 0$, and from (48)

$$a_6(r_4 T_x / T_y - r_1) = 0. \qquad (52)$$

If none of $a_6$, $a_7$ is zero, then from (52)

$$r_4 = r_1 T_y / T_x \qquad (53)$$

and from (46), $$r_5 = r_2 T_y / T_x \qquad (54)$$

and from (47), $$r_6 = r_3 T_y / T_x. \qquad (55)$$

Then from (53)-(55), (51) again holds, which is impossible for the same reason stated earlier. Therefore, at least one of $a_i$ must vanish. Again, for symmetry and simplicity, we take $a_6$ to be zero. Then from (43) $a_2 = 0$. From (49)

$$a_7(r_1 r_4 T_x/T_y) = 0. \quad (56)$$

From (50), $$a_7(r_2 r_5 T_x/T_y) = 0. \quad (57)$$

If, at this point, $a_7$ is not zero, then from (47)

$$r_3 = r_6 T_x/T_y$$

from (56), $$r_1 = r_4 T_x/T_y$$

from (57), $$r_2 = r_5 T_x/T_y$$

which implies that $$\begin{bmatrix} r_1 \\ r_2 \\ r_3 \end{bmatrix} = \frac{T_x}{T_y} \begin{bmatrix} r_4 \\ r_5 \\ r_6 \end{bmatrix}$$

is impossible. Thus $a_7$ must vanish, which also implies from (44) that $a_3 = 0$. In conclusion, the necessary and sufficient condition for (30) is that $a_i = 0$ for $i = 1, \cdots, 7$.

*Proof for the Linear Independence of Columns of Coefficient Matrix in (10)*

The only differences between coefficient matrix in (10) and in (16) are that $(X_d, Y_d)$ is used in (10), while $(X'_d, Y'_d) = (s_x X_d, Y_d)$ is used in (16), and that the column space of (10) is part of the column space in (16) (the third and seventh columns are missing (10)). By setting $D_2$ in (28) to an identity matrix, which takes care of the first difference, and by considering the fact that the subspace of a linearly independent column space is always linearly independent, the coefficient matrix in (10) also has linearly independent columns. This completes the proof.

APPENDIX III

PROOF OF LEMMA 1

*Lemma 1:* There do not exist two 3 × 3 orthonormal matrices that differ in their 2 × 2 submatrix by a scale factor other than ±1. Equivalently, if the 2 × 2 submatrix of a 3 × 3 orthonormal matrix is given except for the scale factor, then that scale factor is unique except for the sign.

*Proof:* Let $R$ be defined as a 3 × 3 orthonormal matrix defined in (2), and let $R_2$ be the 2 × 2 submatrix of $R$:

$$R_2 = \begin{bmatrix} r_1 & r_2 \\ r_4 & r_5 \end{bmatrix}.$$

The purpose is to show that there is no way one can construct a 3 × 3 orthonormal matrix from a 2 × 2 submatrix $$C = s \cdot \begin{bmatrix} r_1 & r_2 \\ r_4 & r_5 \end{bmatrix}$$

with $s$ different from ±1. Since orthonormality is maintained no matter how the rows and columns are permuted, we assume that the 2 × 2 submatrices are in the upper left corner of the 3 × 3 orthonormal matrices. Let $R$ and $R_c$ be 3 × 3 orthonormal matrices constructed from $R_2$ and $C$. Then from the fact that the norm of each row and column of $R$ is unity (without yet considering orthogonality), $R$ must assume the following form:

$$R = \begin{bmatrix} r_1 & r_2 & \pm(1-r_1^2-r_2^2)^{1/2} \\ r_4 & r_5 & \pm(1-r_4^2-r_5^2)^{1/2} \\ \pm(1-r_1^2-r_4^2)^{1/2} & \pm(1-r_2^2-r_5^2)^{1/2} & \pm(-1+S_r)^{1/2} \end{bmatrix} \quad (58)$$

where $S_r = r_1^2 + r_2^2 + r_4^2 + r_5^2$.

Similarly, if $R_c$ exists, it must assume the following form (using the property of unity row and column norm only)

$$R_c = \begin{bmatrix} sr_1 & sr_2 & \pm[1-s^2(r_1^2-r_2^2)]^{1/2} \\ sr_4 & sr_5 & \pm[1-s^2(r_4^2-r_5^2)]^{1/2} \\ \pm[1-s^2(r_1^2-r_4^2)]^{1/2} & \pm[1-s^2(r_2^2-r_5^2)]^{1/2} & \pm(-1+s^2 S_r)^{1/2} \end{bmatrix} . \quad (59)$$

In the following, it is to be shown that with the orthogonality condition imposed, $s$ is forced to take the values of ±1 only.

Since the first two columns of $R$ are mutually orthogonal, we have $$r_1 r_2 + r_4 r_5 = \pm(1-r_1^2-r_4^2)^{1/2}(1-r_2^2-r_5^2)^{1/2}. \quad (60)$$

Similarly, for $R_c$, $$s^2(r_1 r_2 + r_4 r_5) = \pm[1-s^2(r_1^2+r_4^2)]^{1/2}[1-s^2(r_2^2+r_5^2)]. \quad (61)$$

By substituting $r_1 r_2 + r_4 r_5$ in (61) with the right-hand side of (60), (61) becomes $$(1-S_r)s^4 + S_r s^2 - 1 = 0$$

or $$[(1-S_r)s^2 + 1](s^2 - 1) = 0. \quad (62)$$

From (62), $s^2$ can assume two possible values:

$$s^2 = 1 \quad (63)$$

or $$s^2 = \frac{1}{S_r - 1}. \quad (64)$$

Now we show that (64) is valid and is equivalent to (63). Observe that $r_9$ (the (3, 3)th element) in (58)) is $\pm(-1 + S_r)^{1/2}$. Since $|r_9| \leq 1$, we have $$-1 + S_r \leq 1. \quad (65)$$

Let the (3, 3)th element of $R_c$ be denoted as $r_{c9}$. Substituting (64) into the expression for $r_{c9}$ in (59) gives $$r_{c9} = \pm \left(1 - \frac{S_r}{S_r - 1}\right)^{1/2}$$

$$= \pm \left(\frac{1}{S_r - 1}\right)^{1/2}.$$

Since $|r_{c9}| \leq 1$, $1/(S_r - 1) \leq 1$, or $$S_r - 1 \geq 1. \quad (66)$$

From (65) and (66) $S_r - 1 = 1$. Thus (64) becomes $$s^2 = 1. \quad (67)$$

Thus $s = \pm 1$. This completes the proof.

APPENDIX IV

DERIVATION OF COMPUTATION PROCEDURE FOR $T_y$

Case I: Not a Whole Row or Column of C Vanishes

From the definition of C and $r_1', r_2', r_4', r_5'$ in (11), we have $$R = \begin{bmatrix} r_1' T_y & r_2' T_y & r_3 \\ r_4' T_y & r_5' T_y & r_6 \\ r_7 & r_8 & r_9 \end{bmatrix}. \quad (68)$$

Using the property that the rows and columns of $R$ have unity norm, we have $$R = \begin{bmatrix} r_1' T_y & r_2' T_y & \pm[1 - T_y^2(r_1'^2 + r_2'^2)]^{1/2} \\ r_4' T_y & r_5' T_y & \pm[1 - T_y^2(r_4'^2 + r_5'^2)]^{1/2} \\ \pm[1 - T_y^2(r_1'^2 + r_4'^2)]^{1/2} & \pm[1 - T_y^2(r_2'^2 + r_5'^2)]^{1/2} & \pm(-1 + S_r T_y^2)^{1/2} \end{bmatrix} \quad (69)$$

where $S_r = r_1'^2 + r_2'^2 + r_4'^2 + r_5'^2$.

Since the first two columns of $R$ in (69) are mutually orthogonal, we have $$(r_1' r_5' - r_2' r_4')^2 T_y^4 - S_r T_y^2 + 1 = 0. \quad (70)$$

There are two solutions for (70):

$$T_y^2 = \frac{S_r - [S_r^2 - 4(r_1' r_5' - r_4' r_2')^2]^{1/2}}{2(r_1' r_5' - r_4' r_2')^2} \quad (71a)$$

and $$T_y^2 = \frac{S_r + [S_r^2 - 4(r_1' r_5' - r_4' r_2')^2]^{1/2}}{2(r_1' r_5' - r_4' r_2')^2}.$$

From Lemma 1, $|T_y|$ of $T_y^2$ is unique. Thus only one among (71a) and (71b) is valid. We now prove that only (71a) or (71b) is valid. Substituting (70) into expression for $r_9$ in (69) gives $$r_9 = \pm[T_y^4(r_1' r_5' - r_4' r_2')^2]^{1/2}. \quad (71)$$

Thus from (71)

$$T_y^2 |(r_1' r_5' - r_4' r_2')| \leq 1. \quad (72)$$

Substituting (71b) into (72) gives $$\frac{S_r + [S_r^2 - 4(r_1' r_5' - r_4' r_2')^2]^{1/2}}{2|r_1' r_5' - r_4' r_2'|} \leq 1. \quad (73)$$

After some simple algebraic manipulation, the following is derived:

$$S_r \leq 2|r_1' r_5' - r_4' r_2'| \leq 2(|r_1' r_5'| + |r_4' r_2'|). \quad (74)$$

However, from triangular inequality, $$r_1'^2 + r_2'^2 \geq 2|r_1' r_2'| \qquad r_2'^2 + r_4'^2 \geq 2|r_2' r_4'|.$$

Substituting the above two equations into (74) gives $$2|r_1' r_5'| + 2|r_2' r_4'| \leq S_r \leq 2|r_1' r_5' - r_4' r_2'| \leq 2(|r_1' r_5'| + |r_4' r_2'|).$$

Notice in the above inequality expressions that the leftmost expression and the rightmost expression are identical. Thus equality must hold throughout, giving $$S_r = 2|r_1' r_5' - r_4' r_2'|.$$

Substituting the above into (73) gives $$\frac{S_r + [S_r^2 - 4(r_1' r_5' - r_4' r_2')^2]^{1/2}}{S_r} = 1$$

$$+ \frac{[S_r^2 - 4(r_1' r_5' - r_4' r_2')^2]^{1/2}}{S_r} \leq 1$$

or $$\frac{[S_r^2 - 4(r_1' r_5' - r_4' r_2')^2]^{1/2}}{S_r} = 0.$$

The above implies that whenever (71b) is valid, (71a) and (71b) are identical, meaning that (71b) is either invalid or not needed.

*Case II: A Whole Row or Column of C Vanish*

The derivation is the same no matter which row or column vanishes. Suppose $r_1'$ and $r_2'$ vanish. Then $$R = \begin{bmatrix} 0 & 0 & r_3 \\ r_4' T_y & r_5' T_y & r_6 \\ r_7 & r_8 & r_9 \end{bmatrix}.$$

Since the first row has norm unity, $r_3 = \pm 1$. Again, since the third column has norm unity, $r_6 = r_9 = 0$. Then, $$R = \begin{bmatrix} 0 & 0 & \pm 1 \\ r_4' T_y & r_5' T_y & 0 \\ r_7 & r_8 & 0 \end{bmatrix}. \quad (76)$$

Since the second row has unity norm, we have $$r_4'^2 T_y^2 + r_5'^2 T_y^2 + 0 = 1$$

or $$|T_y| = (r_4'^2 + r_5'^2)^{-1/2}. \quad (77)$$

In general, for Case II, $$|T_y| = (r_i'^2 + r_j'^2)^{-1/2}$$

where $r_i'$, $r_j'$ are the elements in the row or column of C that do not vanish.

Case II actually rarely happens, since from (76) the transformation between $(x, y, z)$ and $(x_w, y_w, z_w)$ entails a swap of $x$ and $z$ axes, and since the $x_w$ and $y_w$ axes are always set parallel to the plane containing the calibration points for convenience, this means the camera is viewing in a direction tangent to the calibration plane, which is unlikely to happen.

APPENDIX V

PROOF FOR LEMMA 2 FOR THE COMPUTATION OF $R$

*Lemma 2:* Given 2 × 2 submatrix of a 3 × 3 orthonormal matrix, there are exactly two possible solutions for the orthonormal matrix. They are given in (14a) and (14b).

*Proof:* Let the signs of $r_i$, $i = 3, 6, 7, 8, 9$, be defined as $s_i$. From the fact that the norm of the first and second rows are 1, we have $$R = \begin{bmatrix} r_1 & r_2 & s_3(1 - r_1^2 - r_2^2)^{1/2} \\ r_4 & r_5 & s_6(1 - r_4^2 - r_5^2)^{1/2} \\ r_7 & r_8 & r_9 \end{bmatrix}$$

where $r_7, r_8, r_9$ are determined from the first two rows using the orthonormal property and the fact the det $(R) = 1$ once $s_3$ and $s_6$ are fixed. There are two cases to be discussed.

*1) $s_3 = 1$:* From the orthogonality between the first two rows, we have $$r_1 r_4 + r_2 r_5 + s_6 (1 - r_1^2 - r_2^2)^{1/2} (1 - r_4^2 - r_5^2)^{1/2} = 0. \quad (78)$$

Since $(1 - r_1^2 - r_2^2)^{1/2}$ and $(1 - r_4^2 - r_5^2)^{1/2}$ are positive, we have $$s_6 = -\text{sgn}(r_1 r_4 + r_2 r_5). \quad (79)$$

Note that in case when $r_1^2 + r_2^2 = 1$, then $r_3 = 0$, which means that $s_3$ need not be considered. In this case, $s_6$ can be +1 or −1. Taking $s_6$ to be (79) is convenient since $s_6$ for the other solution of $R$ will be complementary to (78) (i.e., $s_6 = \text{sgn}(r_1 r_4 + r_2 r_4)$). Therefore, (14a) is one solution.

*2) $s_3 = -1$:* In this case, (78) becomes $$r_1 r_4 + r_2 r_5 - s_6(1 - r_1^2 - r_2^2)^{1/2}(1 - r_4^2 - r_5^2)^{1/2} = 0$$

giving $$s_6 = \text{sgn}(r_1 r_4 + r_2 r_5).$$

From the orthogonality between first column and third column of $R$, it is seen that changing the signs of $r_3$ and $r_6$ from case 1 to case 2 causes the product of the signs of $r_7$ and $r_9$ to be reversed. Similarly, from the orthogonality between the second column and third column or $R$, changing the signs of $r_3$ and $r_6$ causes $s_8 \cdot s_9$ to be reversed in sign. Since $r_1, r_2, r_4, r_5$ are fixed, from the orthogonality of the first column and second column of $R$, $s_7 \cdot s_8$ is reversed in sign. In summary, changing from case 1 to case 2 causes the following to happen:

$$s_7 \cdot s_8 \to s_7 \cdot s_8$$
$$s_7 \cdot s_9 \to -s_7 \cdot s_9$$
$$s_8 \cdot s_9 \to -s_8 \cdot s_9. \quad (80)$$

There are only two possibilities when changing from case 1 to case 2 as a result of (80):

$$s_9 \to -s_9 \quad s_7 \to s_7 \quad s_8 \to s_8$$
$$s_9 \to s_9 \quad s_7 \to -s_7 \quad s_8 \to -s_8.$$

It is easy to show that a) causes det $(R)$ to be reversed, while b) maintains det $(R)$ to be +1. Thus only b) is valid. Thus (14b) is the solution for case 2.

ACKNOWLEDGMENT

Many thanks are due to Reimar Lenz for his helpful comments.

NOTE ADDED IN PROOF

It has been a common practice in the computer vision area to choose the center of the image frame buffer as the image origin. This is always fine for analysis of 2D patterns. For 3D vision, the proper choice of the image center can be critical. We reported in this paper that altering the image center by as much as ten pels does not significantly influence the accuracy of 3D measurement using the calibrated camera. After the author submitted the paper, we began investigating this image center issue more seriously and found some interesting results. We derived several new methods for estimating image centers efficiently and accurately, and performing real experiments to test them. We also derived some formulae on how the image center error influences the accuracy of actual 3D measurement. Real experiments were done to verify these formulae. As a result of such investigation, we found that the image center for normal discrete array cameras can be off from the apparent center of the frame buffer by much more than ten pels. Furthermore, the comments which were made on the image center are true only for either 3D measurement of object points close to the plane for which the camera was originally calibrated, or for rather coarse 3D measurement. These results are published in [28]. In order to use the technique described herein, it is recommended that the readers also read [28].

REFERENCES

[1] Y. I. Abdel-Aziz and H. M. Karara, "Direct linear transformation into object space coordinates in close-range photogrammetry," in *Proc. Symp. Close-Range Photogrammetry*, Univ. of Illinois at Urbana-Champaign, Urbana, 1971, pp. 1–18.

[2] ——, *Photogrammetric Potential of Non-Metric Cameras*. Civil Engineering Studies, Photogrammetry Series 36. Urbana, IL, Univ. of Illinois, 1974.

[3] D. C. Brown, "Close-range camera calibration," *Photogrammetric Eng.*, vol. 37, pp 855–866, 1971.

[4] R. R. Cohen and E. A. Feigenbaum, Ed., *The Handbook of Artificial Intelligence*, vol. III. Heuris Tech Press, William Kaufmann, Inc., 1982.

[5] A. Dainis and M. Juberts, "Accurate remote measurement of robot trajectory motion," in *Proc. Int. Conf. Robotics and Automation*, 1985, pp. 92–99

[6] R. O. Duda and P. E. Hart, *Pattern Recognition and Scene Analysis*. New York, Wiley, 1973.

[7] W. Faig, "Calibration of close-range photogrammetry systems: Mathematical formulation," *Photogrammetric Eng. Remote Sensing*, vol. 41, pp 1479–1486, 1975.

[8] M. Fischler and R. Bolles, "Random sample consensus: A paradigm for model fitting applications to image analysis and automated cartography," in *Proc. Image Understanding Workshop*, Apr. 1980, pp. 71–88.

[9] S. Ganapathy, "Decomposition of transformation matrices for robot vision," in *Proc. Int. Conf. Robotics and Automation*, 1984, pp 130–139.

[10] D. B. Gennery, "Stereo-camera calibration," in *Proc. Image Understanding Workshop*, 1979, pp. 101–108.

[11] E. L. Hall, M. B. K. Tio, C. A. McPherson, and F A. Sadjadi, "Curved surface measurement and recognition for robot vision," in *Conf. Rec. IEEE Workshop on Industrial Applications of Machine Vision*, May 1982.

[12] H. Itoh, A. Miyauchi, and S. Ozawa, "Distance measuring method using only simple vision constructed for moving robots," in *Proc. 7th Int. Conf. on Pattern Recognition*, Montreal, PQ, Canada, vol. 1, 1984, p. 192.

[13] A. Isaguirre, P. Pu, and J. Summers, "A new development in camera calibration: Calibrating a pair of mobile cameras," in *Proc. Int. Conf. Robotics and Automation*, 1985, pp. 74–79.

[14] H. M. Karara, Ed., *Handbook of Non-Topographic Photogrammetry*. Amer. Soc. of Photogrammetry, 1979.

[15] D. G. Lowe, "Solving for the parameters of object models from image descriptions," in *Proc. Image Understanding Workshop*, Apr. 1980, pp. 121–127.

[16] J. Y. Luh and J. A. Klaasen, "A three-dimensional vision by off-shelf system with multi-cameras," *IEEE Trans. Pattern Anal. Machine Intell.*, vol. PAMI-7, pp. 35–45, Jan. 1985.

[17] Malhotra, "A computer program for the calibration of close-range cameras," *Proc. Symp. Close Range Photogrammetric Systems*, Urbana, IL, 1971.

[18] *Manual of Photogrammetry*, 4th ed., Amer. Soc. of Photogrammetry, 1980.

[19] H. A. Martins, J. R. Birk, and R. B. Kelley, "Camera models based on data from two calibration planes," *Computer Graphics Image Processing*, vol. 17, pp. 173–180, 1981.

[20] H. Moravec, *Robot Rover Visual Navigation*, UMI Research Press, 1981.

[21] A. Okamoto, "Orientation and construction of models, Part I: The orientation problem in close-range photogrammetry," *Photogrammetric Eng. Remote Sensing*, vol. 47, pp. 1437–1454, 1981.

[22] A. Okamoto, "The model construction problem using the collinearity condition," *Photogrammetric Eng. Remote Sensing*, vol. L, pp. 705–711, 1984.

[23] I. Sobel, "On calibrating computer controlled cameras for perceiving 3-D scenes," *Artificial Intell.*, vol. 5, pp. 185–188, 1974.

[24] T. M. Strat, "Recovering the camera parameters from a transformation matrix," in *Proc. DARPA Image Understanding Workshop*, Oct. 1984, pp. 264–271.

[25] I. Sutherland, "Three-dimensional data input by tablet," *Proc. IEEE*, vol. 62, pp. 453–461, Apr. 1974.

[26] R. Y. Tsai, "Accuracy analysis and prediction for 3D robotics vision metrology," IBM Research Report RC 11348, in preparation.

[27] R. Y. Tsai, "Review of the two-stage camera calibration techniques plus some new implementation tips and new techniques for center and scale calibration," 2nd Topical Meeting on Machine Vision, Optical Society of America, March 18–20, 1987. Also IBM RC 12301.

[28] R. K. Lenz and R. Y. Tsai, "Techniques for calibration of the scale factor and image center for high accuracy 3D machine vision metrology," *Proc. IEEE Int. Conf. Robotics and Automation*, Raleigh, NC, March 31–April 3, 1987.

[29] R. Y. Tsai, "A versatile camera calibration technique for high accuracy 3D machine vision metrology using off-the-shelf TV cameras and lenses," IBM RC 11413, October 1985.

[30] K. W. Wong, "Mathematical formulation and digital analysis in close-range photogrammetry," *Photogrammetric Eng. Remote Sensing*, vol. 41, pp. 1355–1373, 1975.

[31] Y. Yakimovsky and R. Cunningham, "A system for extracting three-dimensional measurements from a stereo pair of TV cameras," *Computer Graphics Image Processing*, vol. 7, pp. 195–210, 1978.

Roger Y. Tsai was born in Taiwan, Republic of China, on May 10, 1956. He received the M.S degree from Purdue University, Lafayette, IN, and the Ph.D. degree from University of Illinois at Urbana-Champaign, both in electrical engineering, in 1980 and 1981, respectively.

He was employed by Bell-Northern Research/INRS-Telecommunications, Montreal, Canada, for three months during the summer of 1979 as a Visiting Scientist, working on moving image registration and enhancement. During the summer of 1980, he was employed by the Signal Processing Group, EPFL, Lausanne, Switzerland, for three months working on 3D time-varying scene analysis. In the summer of 1981, he again visited BNR/INRS, Montreal, for three months, working on image sequence analysis and computer vision. He is now with IBM T. J. Watson Research Center, Yorktown Heights, NY He was the recipient of the Best Paper Award for 1986 IEEE International Conference on Computer Vision and Pattern Recognition and the 1986 IBM External Honor Award. His major research interests include 3D robotics and geometric vision, 3D stereo measurement, 3D object recognition, inspection, part acquisition and automated assembly, 3D time-varying scene analysis, 3D model based driven vision, etc.

We claim:

1. A method of calibrating an omnidirectional camera comprising:
   collecting calibration points based on points having known positions in a physical environment using the omnidirectional camera; and
   determining at least one correction factor based on the plurality of calibration points, each correction factor being used to correct a deviation of the omnidirectional camera from an ideal camera model, wherein
   the omnidirectional camera includes a camera lens system and a curved mirror, a reflective-side of the curved mirror facing the camera lens system, and
   the determining the at least one correction factor includes computing a distance from a focal point of the curved mirror to a center-of-projection of the camera lens system, the focal point of the curved mirror being located at a side opposite the reflective-side of the curved mirror and at a distance from the curved mirror along the curved mirror's central axis.

2. The method of claim 1, wherein
   the curved mirror is an attached convex paraboloidal mirror,
   the omnidirectional camera records images reflected by the attached convex paraboloidal mirror onto an image plane, and
   the determining step determines at least one correction factor that includes at least one of an effective convergence distance of reflected lights rays from the mirror, a camera-to-world translation, a camera-to-world rotation, a radial distortion, and an uncertainty scale factor from a series of calibration points.

3. The method of claim 2, wherein the at least one correction factor is used to obtain an effective subset of the mirror reflecting a 360 degree by 180 degree field of view of the physical environment.

4. The method of claim 2, wherein the camera-to-world translation represents a lateral offset between the image plane and a reference plane of the mirror.

5. The method of claim 2, wherein the camera-to-world rotation represents a rotation of a reference plane of the mirror with respect to an assumed coordinate frame of the physical environment.

6. The method of claim 2, wherein the effective convergence distance of light rays reflected off the mirror represents a distance in front of the reflective side of the mirror at which a convergence point of the reflected light rays is located.

7. The method of claim 2, wherein the radial distortion includes at least one coefficient used to define a first-order or higher approximation of the radial component of lens distortion.

8. The method of claim 2, wherein the uncertainty scale factor includes at least one coefficient used to scale an effective size of pixels in the image plane.

9. The method of claim 1, wherein the step of collecting calibration points comprises:
   moving the omnidirectional camera to various positions within the physical environment;
   recording an image of the physical environment with the omnidirectional camera at each of the various positions; and
   for each recorded image,
      identifying calibration points in the recorded image, each calibration point having a known, fixed position within the physical environment, and
      determining an image position of each identified calibration point.

10. The method of claim 9, wherein the calibration points comprise visually distinct features within the physical environment.

11. The method of claim 2, wherein the step of determining at least one correction factor comprises:
    modeling the omnidirectional camera using at least one model parameter;
    optimizing the at least one model parameter to best-fit the calibration points; and
    calculating the at least one correction factor according to the at least one model parameter.

12. The method of claim 11, wherein the modeling steps models the omnidirectional camera according to a perspective camera model.

13. The method of claim 12, wherein the perspective camera model constitutes a pinhole camera model.

14. The method of claim 11, wherein the optimizing step includes,
    making an initial estimate of the value of each of the at least one model parameter, the at least one model parameter including a distance from the focal point of the mirror from which light rays reflected from the mirror converge, a camera-to-world translation, a camera-to-world rotation, a radial distortion, and an uncertainty scale factor; and
    performing an iterative procedure including,
       a) determining a fitness of the estimated values for the at least one model parameter according to predetermined criteria;
       b) re-estimating the value of each the at least one model parameter according to the determined fitness when the predetermined criteria is not satisfied; and
       c) repeating the above steps until the predetermined criteria is satisfied.

15. A system for calibrating an omnidirectional camera comprising:
    data storage device for storing images recorded using the omnidirectional camera;
    extracting means for extracting calibration points based on points having known positions in a physical environment from the stored images; and
    processing means for determining at least one correction factor based on the plurality of calibration points, each correction factor being used to correct a deviation of the omnidirectional camera from an ideal camera model, wherein
    the omnidirectional camera includes a camera lens system and a curved mirror, a reflective-side of the curved mirror facing the camera lens system, and
    the processing means for determining the at least one correction factor computes a distance from a focal point of the curved mirror to a center-of-projection of the camera lens system, the focal point of the curved mirror being located at a side opposite the reflective-side of the curved mirror and at a distance from the curved mirror alone the curved mirror's central axis.

16. The system of claim 15, wherein
    the curved mirror is an attached convex paraboloidal mirror,
    the omnidirectional camera records images reflected by the attached convex paraboloidal mirror onto an image plane, and
    the processing means determines at least one calibration factor that includes at least one of an effective convergence distance of recorded light rays from the mirror, an effective subset of the mirror, a camera-to-world translation, a radial distortion, and an uncertainty factor in the horizontal direction from a series of calibration points.

17. The system of claim 16, wherein the processing means further includes,
modeling means for modeling the omnidirectional camera using at least one model parameter;
optimizing means for optimizing the at least one model parameter to best-fit the extracted calibration points; and
calculating means for calculating the at least one correction factor according to the at least one model parameter.

18. A method for modeling an omnidirectional camera, which is configured to record images reflected by an attached convex paraboloidal mirror onto an image plane, the method comprising:
defining at least one model parameter including at least one of an effective convergence distance of reflected light rays from the mirror, a camera-to-world translation, a camera-to-world rotation, a radial distortion, and an uncertainty scale factor;
optimizing the at least one model parameter to best-fit a set of calibration points based on points having known positions in a physical environment obtained using the omnidirectional camera, the calibration points comprising a set of visually distinct features of known, fixed location within the physical environment of the omnidirectional camera, wherein
the omnidirectional camera includes a camera lens system and the attached convex parabolodial mirror, a reflective-side of the attached convex, parabolodial mirror facing the camera lens system, and
the optimizing the at least one model parameter includes computing a distance from a focal point of the attached convex paraboloidal mirror to a center-of-projection of the camera lens system, the focal point of the attached convex parabolodial mirror being located at a side opposite the reflective-side of the curved mirror and at a distance from the curved mirror along the curved mirror's central axis.

19. The method of claim 18, further comprising,
using the optimized at least one model parameter to estimate a pose of the omnidirectional camera based on images recorded by the omnidirectional camera.

* * * * *